US010466876B2

(12) United States Patent
Wang et al.

(10) Patent No.: US 10,466,876 B2
(45) Date of Patent: Nov. 5, 2019

(54) ASSISTING A USER OF A SOFTWARE APPLICATION

(71) Applicant: Facebook, Inc., Menlo Park, CA (US)

(72) Inventors: Qian Wang, Sunnyvale, CA (US); Michael James Matas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 320 days.

(21) Appl. No.: 14/255,750

(22) Filed: Apr. 17, 2014

(65) Prior Publication Data

US 2015/0301729 A1    Oct. 22, 2015

(51) Int. Cl.
*G06F 3/0484* (2013.01)
*G06F 3/0485* (2013.01)
*G06F 3/0488* (2013.01)

(52) U.S. Cl.
CPC ........ *G06F 3/04842* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 5,598,522 A * | 1/1997 | Inatomi | ............... | G06F 3/04895 715/821 |
| 6,639,687 B1 * | 10/2003 | Neilsen | ............... | G06F 11/0715 358/1.1 |
| 6,900,835 B2 * | 5/2005 | Cazier | ............... | H04N 1/00437 348/231.2 |
| 7,080,327 B1 * | 7/2006 | Bartz | ............... | G06F 8/34 715/709 |
| 2006/0010394 A1 * | 1/2006 | Chaudhri | ............... | B60K 35/00 715/779 |
| 2008/0129686 A1 * | 6/2008 | Han | ............... | G06F 3/0482 345/156 |
| 2009/0160809 A1 * | 6/2009 | Yang | ............... | G06F 3/04845 345/173 |
| 2009/0319894 A1 * | 12/2009 | Markiewicz | ............... | G06F 3/04883 715/702 |
| 2010/0283743 A1 * | 11/2010 | Coddington | ............... | G06F 3/0485 345/173 |
| 2013/0019174 A1 * | 1/2013 | Gil | ............... | G06F 3/04812 715/711 |
| 2013/0212535 A1 * | 8/2013 | Kim | ............... | G06F 3/0482 715/841 |
| 2015/0186944 A1 * | 7/2015 | Forsblom | ............... | G06Q 30/0267 705/14.64 |

* cited by examiner

*Primary Examiner* — Scott T Baderman
*Assistant Examiner* — Parmanand D Patel
(74) *Attorney, Agent, or Firm* — Keller Jolley Preece

(57) ABSTRACT

The principles described herein provide methods and systems of providing new user assistance information for performing actions within a user interface as a user navigates the user interface. For example, information may be presented to the user in a way that aids the user in discovering and performing available actions within the user interface without being overly disruptive to the user.

20 Claims, 16 Drawing Sheets

ASSISTING A USER OF A SOFTWARE APPLICATION

BACKGROUND

1. Technical Field

One or more embodiments relate generally to systems and methods for assisting a user of a software application. More specifically, one or more embodiments relate to systems and methods of providing a new user of a software application with information for performing actions available within a user interface of a software application.

2. Background and Relevant Art

Software applications running on electronic or computing devices, including mobile devices (e.g., smart phones, tablets), each provide features and a user experience specific to the corresponding application. Separate applications typically have different visual layouts and frequently introduce different ways to perform actions as part of the user experience. For example, an application that allows a user to view various types of content (such as articles, pictures, etc.) may present the content in different ways and require different inputs and gestures for navigating the content than other applications.

Due to the layout and input differences in applications—even applications that provide similar content—the user experience may vary drastically across the different applications. Learning a new application may require users to learn new actions, settings, and gestures. Even changing from an application with which a user is familiar to a different application with similar content frequently results in the user needing to relearn how to navigate the similar content. As a result, some applications provide assistance (e.g., tips or instructions) to new users to aid the users in learning how to use the application. This process of assisting new users of an application is commonly referred to as "onboarding" users.

However, traditional methods of onboarding users suffer from a number of disadvantages. For example, some applications provide instructions for a multitude of features all at once when the user opens the application the first time, regardless of the user's experience with the application (e.g., from use of the application on another device) or the user's ability or desire to navigate the application without assistance. This may interrupt the normal user experience, may be disruptive or annoying to the user, especially if the user is already familiar with the application, and/or may fail to provide a user with the assistance that is most relevant to or needed by the user.

Accordingly, there are a number of considerations to be made in improving new user experiences within user interfaces.

BRIEF SUMMARY OF THE INVENTION

Embodiments of the present invention provide benefits and/or solve one or more of the foregoing or other problems in the art with onboarding users of a software application (e.g., a mobile application or "app"). The principles described herein provide features that improve user experience for new users of an application and provide new users with information and assistance tailored to the users' specific situations and interests. Furthermore, the principles described herein allow a new user of an application to naturally discover one or more features of the application without the disruption and delays typically associated with onboarding users.

In some embodiments, various instances of user assistance information may be strategically prioritized and presented to a user in a way that most effectively aids the user in navigating and discovering a software application. The user assistance information may be prioritized based on a variety of factors associated with actions available to the user. For example, the actions available to the user can be prioritized based on ease of use, discoverability, importance, difficulty, or location within the application, as well as on any other suitable prioritization factor. Once the actions are prioritized, corresponding user assistance information can be presented to the user in accordance with the prioritization. Accordingly, a user is presented with the most relevant and helpful assistance as the user interacts with the software application.

In addition, a timing of the user assistance information can be managed so as to not disrupt the user's experience or detract from the user's enjoyment of a software application. To illustrate, the timing for presenting user assistance information may be strategically managed to allow the user the opportunity to naturally discover and learn actions without the need for user assistance information. For example, rather than presenting user assistance information automatically when an application is opened, the user assistance information may be withheld to give the user the opportunity to interact with the application until presentation of the user assistance information is most helpful. In addition, each instance of user assistance information can be withheld until it is most relevant to what the user is doing within the application. As a result, the user is allowed to enjoy the software application until such time as the user needs and wants assistance. Additional features and advantages of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
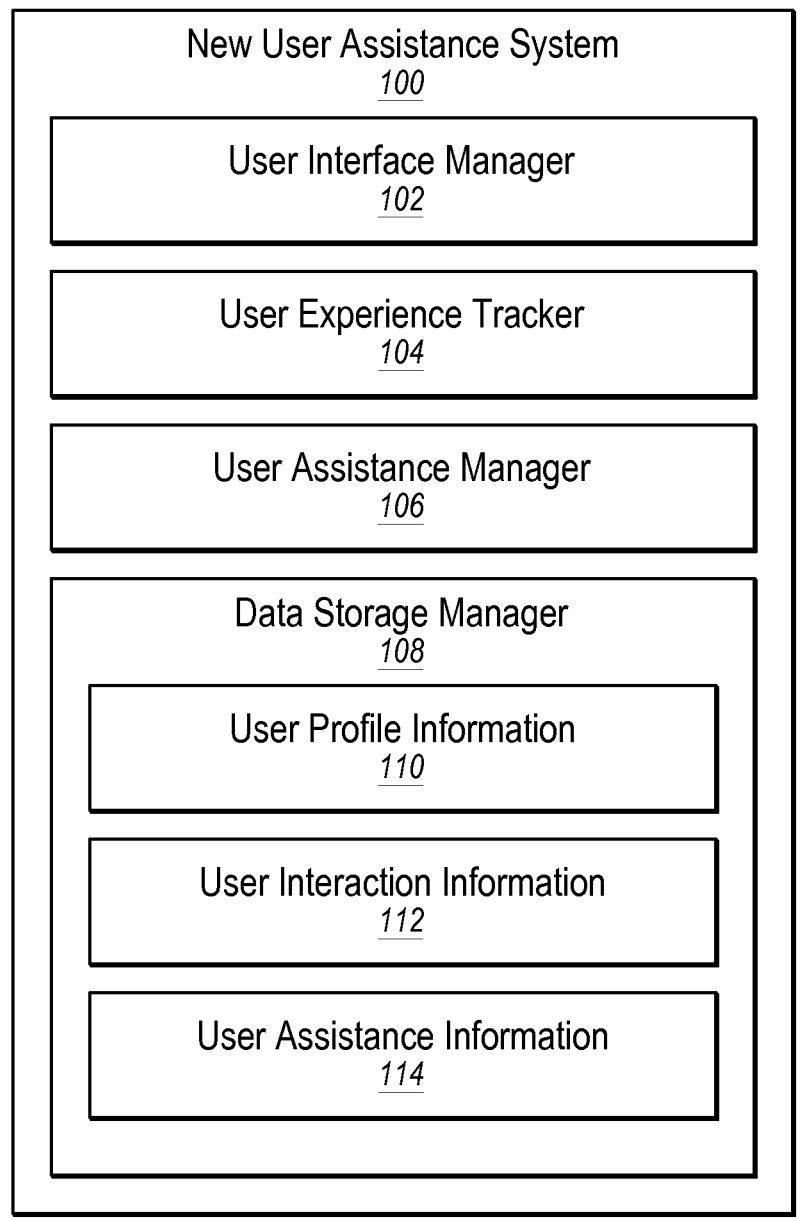
FIG. 1 illustrates an example new user assistance system according to principles described herein.

The present disclosure is directed to providing assistance to a new user of a software application by presenting relevant assistance information to the user without interrupting the user's natural experience with the software application. For example, various actions available to a user may have corresponding new user assistance information to aid the user in completing the actions. The new user assistance information may be presented to the user in a way that allows the user to easily and quickly learn how to perform the corresponding action without unduly disrupting the user's experience with the software application.

In one or more embodiments, a first view of a graphical user interface may be presented to the user. The user can interact with the graphical user interface by way of one or more actions available within the first view. For example, the user can utilize the one or more actions to interact with one or more content items and/or options within the first view of the graphical user interface. If it appears that the user needs assistance (e.g., if there is a delay in the user's interaction with the graphical user interface), the user may be presented with user assistance information for a particular action available within the first view. In order to provide the most relevant and useful user assistance information, the one or more actions available within the first view may be prioritized based on a variety of factors. Once the available actions are prioritized, user assistance information may be provided to the user in accordance with the prioritization. For example, instances of user assistance information associated with the prioritized actions may be presented to the user in the order of priority.

As used herein, the term "user assistance information" may refer generally to any information and/or content used to assist a user of an application to become familiar with one or more features of the application. In some embodiments, an instance of user assistance information can include audio and/or graphical content—such as text, images, animations, videos, sounds, music, and speech—that provides information related to an action available within a graphical user interface. For example, presenting user assistance information for a particular action may include presenting instructions for performing the action and a visual demonstration of the action.

In some embodiments, the principles disclosed herein may be implemented with respect to a social-networking system. In particular, a mobile social-networking application can be configured to include the user assistance features disclosed herein. The mobile social-networking application may facilitate interaction with content available through the social-networking system or other users of the social-networking system. As the user interacts with the mobile social-networking application, the mobile application may provide the user with user assistance information to help the user perform actions within the social-networking mobile application.

FIG. 1 illustrates an example new user assistance system 100 (or simply "system 100"). As shown, the system 100 may include, but is not limited to, a user interface manager 102, a user experience tracker 104, a user assistance manager 106, and a data storage manager 108, each of which may be in communication with one another using any suitable communication technologies. It will be recognized that although the components (102-108) of the system 100 are shown to be separate in FIG. 1, any of the components may be combined into fewer components, such as into a single component, or divided into more components as may serve a particular embodiment.

The components of the system 100 may function to assist a new user of a software application. For example, the system 100 can help a new user to become familiar with various features of the software. To illustrate, and as will be explained in more detail below, the user interface manager 102 may present a graphical user interface for a software application to a user. The user experience tracker 104 can track the user's interaction with the graphical user interface in order to determine when to present user assistance information to the user. Thereafter, the user assistance manager 106 may help the user learn to perform one or more actions within the software application.

As mentioned, the system 100 can include a user interface manager 102, which may be configured to provide, manage, and/or control a graphical user interface for a software application. For example, the user interface manager 102 may allow a new user of a software application to navigate, access, and/or interact with the software application by way of a graphical user interface. In some embodiments, the user interface manager 102 can provide a social-networking application to facilitate interaction, by a user, with a social-networking system (e.g., Facebook™) to, for example, create, access, and/or navigate social-networking content.

The user interface manager 102 may facilitate interaction with various types of content. As used herein, the terms "content" or "content items" may refer generally to any data or information that may be presented within a user interface. For example, the terms "content" or "content items" may refer to any one or more of the following: text, images, locations, maps, contacts, audio, video, and any other suitable content. In some embodiments, the content may be specific to a social-networking system. For example, the content items may include social-networking posts, images, articles, status updates, or any other content available by way of a social-networking system.

The user interface manager 102 may facilitate performance by a user of one or more actions within a software application. For example, the user interface manager 102 can provide a graphical user interface within which a user can perform one or more actions (e.g., interact with features of the application). To illustrate, the user interface manager 102 can provide a user interface through which a user can select content, open content, expand content, minimize content, create content, and/or navigate among various content items. Additionally, the user interface manager 102 may facilitate interaction by a user with one or more other users. For example, the user interface manager 102 can provide one or more options for a user of a social-networking system to communicate with other users of the social-networking system.

As mentioned above, the user interface manager 102 may be configured to facilitate the performance of one or more actions within a graphical user interface (e.g., using a user input device, such as a touchscreen device). As used herein, the term "action" refers generally to any user interaction with and/or corresponding features of a software application. In some embodiments, the term "action" may refer to a touch gesture through which a user may interact with content or an option available within a graphical user interface (e.g., displayed on a touchscreen). For example, an action may be performed by a user using one or more of tap gestures, swipe gestures, pinch gestures, or other suitable touch gestures. Alternatively, an action may be performed by a user using any other user input, such as clicking, dragging, tilting, shaking, or other possible actions through which the user may interact with content and/or selectable options within a graphical user interface.

As will be understood, as a user performs actions within a user interface, a view of the graphical user interface may change. As used herein, the term "view" refers generally to the portion of a graphical user interface that is visible to a user at a particular time. As the view changes, the content and features available to the user may also change. Because the content and options change as the view changes, the actions available within the graphical user interface also change as the view changes. For example, a first view of a graphical user interface may include a stream or grid of content items. One or more actions for navigating or accessing the content items may be available within the first view. The user can provide an action to access a second view of the graphical user interface. To illustrate, the user may select to view a particular content item for viewing in an expanded view. In response to accessing the second view, one or more additional and/or alternative actions may become available to the user. Just like the available actions change as the user navigates from one view of the user interface to another view, the user assistance information presented to the user may also change.

As described briefly above, the system 100 also includes a user experience tracker 104. The user experience tracker 104 may be configured to detect, receive, and/or otherwise track user activity relative to a user interface. In some examples, the user experience tracker 104 may be configured to detect actions performed by the user. For example, the user experience tracker 104 can detect one or more touch gestures (e.g., swipe gestures, tap gestures, pinch gestures, etc.) provided by a user via a touchscreen. The detected touch gestures may be provided in relation to one or more elements of a graphical user interface presented on the touch screen. In addition, the touch gestures can be provided to perform an action available within the user interface. While many implementations are described herein in relation to touch gestures, the implementations may use other types of user input, such as mouse input, keyboard input, motion input (e.g., provided by way of an accelerometer), voice input or any other type of user input.

The user experience tracker 104 may recognize detected user input as performance of an action available within a graphical user interface. For example, the user experience tracker 104 can detect the user input and identify a corresponding action based on one or more aspects of the user input (e.g., a direction, location, speed, or length of the user input) and the actions available within a current view of graphical user interface to identify the action being performed by the user. In response to a performed action, the system 100 (e.g., user interface manager 102) can manage, control, and/or facilitate navigation of the user interface accordingly. For example, in response to a detected action performed by a user, the system 100 may allow a user to browse, navigate, open, expand, zoom, or otherwise interact with content displayed in the current view. Additionally or alternatively, in response to a detected action performed by a user, the system 100 may change the graphical user interface from a first view to a second view. For example, in response to the performed action, the system 100 may change the content presented within the graphical user interface, open one or more menus of content, expand a content item, or otherwise change the view of the graphical user interface in any other suitable manner.

In one or more embodiments, the user experience tracker 104 can maintain a history of a user's interaction with a software application. For example, the user experience tracker can maintain a record of actions the user has performed, actions the user has yet to perform or experience, actions that the user has difficulty performing, the areas or views of the software application the user has explored, and/or a timing of the user's interactions. To illustrate, for each action available within a software application, the user experience tracker 104 can maintain a record of whether the user has performed the action, how many times a user has performed the action, when the user has performed the action, what the user did before and after performing the action, the view of the software application within which the user performed the action (e.g., if the action is not unique to a particular view of the software application), whether the user has difficulty successfully completing the action, and any other suitable information associated with the user's performance or non-performance of the action. The information maintained by the user experience tracker 104 regarding the user's interactions with the software application may be utilized (e.g., by the user assistance management system) to determine whether, when, and which user assistance information to present to the user in the future.

The user experience tracker 104 can also detect disruptions in user activity. For example, the user experience tracker 104 can monitor the user's interaction with the software application and identify, based on a disruption in user activity, if the user becomes "stuck" or is confused relative to a particular view of the software application. As used herein, the terms "disruption" and "delay" (which are used interchangeably herein) refer generally to any delay, interruption, or disruption in user activity within the software application. For example, disruptions may include periods of time in which a user does not attempt to interact with the user interface, or in which a first action is performed within the user interface and a certain amount of time passes before a second action is performed within the user interface. In another example, disruptions may include unsuccessful user attempts to perform or find actions available within the user interface (e.g., when a user "hunts" for actions but is unable to find any and does not perform any actions specifically associated with the user interface). Disruptions may include any other type of delay or interruption in which the software application determines that assistance may be useful or necessary.

In some examples, the user experience tracker 104 identifies any user activity delays or disruptions that meet or exceed a predetermined threshold. The predetermined threshold can be set to indicate whether a delay in user activity should trigger presentation of user assistance information to the user. For example, the predetermined threshold may be set such that the user experience tracker 104 ignores delays that are customary to a user experience, but flags delays having a length that exceeds what is customary to the user experience, and thereby indicates whether the user has become stuck or needs assistance to proceed. In some embodiments, a customary user experience may be determined based on usage data gathered from other users or during application testing. The predetermined threshold can be any suitable time period—such as one second, two seconds, three seconds, or any other suitable amount of time—or any suitable number of unsuccessful user attempts to perform an action within the software application. In some examples, the threshold may be user-configurable, thereby allowing the user to control when user assistance information is provided to the user. In response to a detected delay, the system 100 may present user assistance information to the user to help the user discover and use features available to the user at the time the user assistance information is presented.

In particular, and as illustrated in FIG. 1, the system 100 may further include a user assistance manager 106. The user assistance manager 106 may be configured to manage the selective presentation of user assistance information to a user of a software application. For example, the user assistance manager 106 may determine whether to present user assistance information, when to provide user assistance information, and which user assistance information to provide. These determinations may be based on a variety of information and factors, as will be explained in more detail below.

For example, the user assistance manager 106 may obtain information regarding a view of a graphical user interface being presented to a user from the user interface manager 102 to determine which actions are available to the user at any particular time. Additionally, the user assistance manager 106 may obtain information regarding an activity delay from user experience tracker 104 to determine when it is advisable to provide user assistance to the user in a non-disruptive manner and when the user needs the assistance the most. The user assistance manager 106 may then identify an instance of user assistance information to present to the user based on the user's past interactions, the actions available to the user at the time of the delay, or any other suitable information, as will be explained in more detail below.

The user assistance manager 106 may collect data corresponding to a user's experiences with a software application in order to specifically tailor the presentation of user assistance information to the user. For example, the user assistance manager 106 may identify the actions available to the user at a particular time (e.g., within a particular view of the software application), determine which of the available actions the user has previously performed (e.g., to identify the actions the user has not yet learned to perform), determine a priority for the actions available to the user (e.g., to identify what user assistance information would be most relevant and beneficial to the user), and identify an appropriate time for presenting user assistance information to the user (e.g., so as to not disrupt the user's natural experience with the software application).

As mentioned above, within each view of a software application, one or more actions may be available to a user. Each available action may be performed by a user using a corresponding user input or command. For example, some actions may be performed using a specific touch gestures assigned to the actions. As the user navigates between different views of the software application, the actions available to the user may change so as to be specific to the current view of the software application being presented to the user.

As will be understood, a new user of a software application may be generally unfamiliar with the actions available within a software application or how to perform the actions. In some cases, a new user may be able to discover and learn how to perform various actions on their own and without any assistance. This may be particularly true of sophisticated users who have a lot of experience interacting with software applications. However, a user may require assistance to perform actions that the user is unable to discover or perform on his or her own.

The user assistance manager 106 can be configured to monitor a user's interaction with a software application to identify which actions the user needs assistance with. For example, the user assistance manager 106 can monitor (e.g., directly or by way of user experience tracker 104) a user's interactions with a software application to identify any actions that the user successfully learns without any assistance (e.g., through the user's own discovery of the application). For example, the user assistance manager 106 may determine that a user successfully discovered and performed a particular action without the need of assistance. Because the user was able to perform the action without assistance, the user assistance manager 106 may decide not to present the user assistance information associated with the particular action. As a result, the user assistance manager 106 can avoid unnecessarily disrupting the user with user assistance information for an action that the user already knows how to perform. Rather, the user assistance manager 106 can focus any presentations of user assistance information on actions that the user has been unable to independently discover and learn. Additionally or alternatively, the user assistance manager 106 can selectively determine which user assistance information to present (or not present) based on any other suitable factors.

The user assistance manager 106 can also prioritize available actions and corresponding user assistance information in order to determine an order of presenting the user assistance information. As a result, user assistance information for higher priority actions can be displayed prior to user assistance information for lower priority actions. The priority assigned to each action may be based on various criteria. For example, the priority may be based on any one or more of the following factors: whether the user has completed the action previously, a difficulty of the action, a discoverability of the action, an assigned order, a interdependency with another action, relevance to the current view presented to the user, and any other suitable factors for prioritizing the actions for presentation of corresponding user assistance information.

As mentioned, the priority may be based on whether an action has been discovered and performed previously or whether user assistance information for the action was presented previously. When an action is successfully performed, the priority assigned to the action may be lowered or removed altogether. For example, the action may be removed entirely from a user assistance queue so that the user assistance information for that action is not ever presented to the user. Alternatively, user assistance information for the performed action may only be presented if the user assistance manager 106 determines that the user needs help remembering how to perform the action (e.g., based on a detected inability on the part of the user to perform the action or a detected delay between performances of the action).

The priority assigned to each action may be additionally based on a discoverability, complexity, difficulty of the associated action, or other factors. As used herein, the term "discoverability" refers generally to an ease with which an action may be discovered without assistance. For example, if a first action appears to be more intuitive or more common (e.g., as determined based on popularity or frequency of use from collected user data) to discover than a second action, the first action may be considered to be more "discoverable" than the second action. Similarly, if a first action is easier to perform (e.g., requires fewer gestures or is performed using a simpler input) than a second action, the first action may be considered easier, or less complex than the second action. A more discoverable or less complex action may be assigned a lower priority than a less discoverable or more complex action, such that, for example, new user assistance information for less discoverable actions is displayed before new user assistance information for more discoverable actions. Accordingly, the user is left to discover more discoverable actions without assistance. Alternatively, more discoverable or less complex actions may be may be assigned a higher priority, such that new user assistance information for more discoverable or less complex actions is displayed before new user assistance information for less discoverable or more complex actions. Accordingly, for example, the user begins by learning easier actions and incrementally advances through more difficult actions.

In some embodiments, actions may be grouped together based on level of difficulty and presented to a user one group at a time. For example, the actions may be divided into a group of beginner actions, intermediate actions, and advanced actions. In addition, the user may be required to advance through the groups one group at a time. For example, in order for the user to advance to the intermediate actions, the user may be required to complete the beginner actions. In additional or alternative embodiments, the actions may be grouped in any other suitable way.

The priority assigned to each new user experience may be additionally based on a display order assigned to the actions. For example, a developer of the software application may assign an order in which the developer desires two or more actions to be presented or taught to the user. To illustrate, a first action may be a prerequisite to a second action, the second action may depend upon the first action, or the second action may build upon the first action. Accordingly, a display order can ensure that user assistance information for the second action is not presented until the user has successfully learned or performed the first action. Thus, for example, a display order of or interdependency between two or more actions may prevent user assistance information for advanced actions from being displayed before simple actions are successfully completed. This allows less experienced users to learn how to interact with the user interface gradually, or to view new user assistance information within the natural flow of the user's experience with the user interface.

Once prioritization of actions is complete, the user assistance manager 106 can create a queue of actions in accordance with the prioritization. For example, the user assistance manager 106 can create the queue starting with the highest priority actions and ended with the lowest priority actions. In some embodiments, the user assistance manager 106 can create an independent queue for each view of a graphical user interface. In other embodiments, the user assistance manager 106 can create a single queue for a software application as a whole. Accordingly, when a user is interacting with a particular view, the user assistance manager 106 can present user assistance information to the user in accordance with a queue of prioritized actions associated with the particular view. If the user changes to a second view, the user assistance manager 106 can present user assistance information to the user in accordance with a queue of prioritized actions associated with the second queue. The user assistance manager can accomplish this process for any number of views and for any number of corresponding actions.

In some embodiments, each time a user successfully performs an action that is in a queue for actions for a particular view—whether through the user's own discovery or with the help of the user assistance manager 106—the user assistance manager 106 can remove the performed action from the queue of prioritized actions for the particular view. Accordingly, once the user has performed the action successfully, the user assistance manager 106 will not unnecessarily disrupt the user with user assistance information for the performed action. Once the user has successfully performed each of the actions associated with a view, the user assistance manager 106 will no longer present the user with user assistance information for that view. Once the user has successfully performed each of the actions associated with each and every view of a software application, the user assistance manager 106 will no longer present the user with any additional user assistance information, unless the user assistance manager 106 later determines that the user has forgotten how to perform a particular action (e.g., based on failed attempts of the action or time since last performing the action).

Even when the user assistance manager 106 presents user assistance information associated with a particular action, the user may choose not to perform the particular action. In particular, the user may choose to dismiss presented user assistance information associated with an action without performing the action at that time. In some cases, the user may actively dismiss the user assistance information by, for example, selecting a provided option to dismiss the user assistance information. Additionally or alternatively, the user may passively dismiss the user assistance information for a particular action by, for example, ignoring the user assistance information and continuing to perform another action instead of the particular action. Accordingly, if the user is not currently interested in the user assistance information at the time it is presented, the user has the option to continue to interact with the software application without performing the presented action. User assistance may also be passively dismissed based on a passage of a certain amount of time at which the user assistance information automatically disappears.

The user assistance manager 106 may modify one or more user assistance queues in accordance with a dismissal of user assistance information for an action. For example, the user assistance manager 106 may delay presentation of the user assistance information for the action until a later time, may alter a priority of the action and its associated user assistance information within a user assistance queue, or may remove the action and its associated user assistance information from the queue entirely. To illustrate, for an action that a user passively dismisses, the user assistance manager 106 may delay presentation of the action until a later time or alter a priority of the action within a user assistance queue. For actions that a user actively dismisses, the user assistance manager 106 may remove the action from a queue, thereby preventing presentation of corresponding user assistance information in the future.

As mentioned above, the presentation of user assistance information may be triggered by an activity delay within a current view of a software application. In some embodiments, the user assistance manager 106 may control and vary the activity delay necessary to trigger the presentation of user assistance information for a particular action, for a particular group of actions, and/or for a particular view of the software application. The length of the activity delay associated with each action (i.e., the threshold activity delay necessary to trigger the presentation of user assistance information for each action based on a predetermined delay/disruption threshold) may be based on the priority assigned to the action or the discoverability of the action. For example, a relatively discoverable action may require a longer activity delay (before the presentation of associated new user assistance information) than an action that is less discoverable, thereby giving the user more time when it is expected that the user will discover the action independently. Alternatively, a less discoverable action may require a longer activity delay (before the presentation of its associated new user assistance information) than a more discoverable action. Additionally or alternatively, other criteria may be used to determine the length of activity delay necessary to trigger the presentation of user assistance information for an action.

Additionally, a resting period may be set to prevent too many instances of user assistance information from being presented to a user at one time. For example, once the user assistance manager 106 presents an instance of user assistance information to a user, the user assistance manager 106 may wait for a predetermined period of time prior to presenting another instance of user assistance information to the user. This "resting period" between presentations of user assistance information may be any suitable amount of time (e.g., 30 seconds, 1 minute, 5 minutes). In some implementations, the resting period may vary based on the determined abilities of the user. For example, if the user assistance manager 106 determines that a user is experiencing difficulty in discovering and learning actions on their own, the user assistance manager 106 may reduce the resting period between presentations of user assistance information. Similarly, if the user assistance manager 106 determines that the user is able to easily discover and learn actions on their own, the user assistance manager 106 may increase the resting period between presentations of user assistance information.

The prioritization of actions and presentation of corresponding user assistance information can be at least partly user configurable. For example, if the user has particular preferences for when and how user assistance information is presented, the user can provide input that is taken into account in prioritizing the available actions and/or presenting user assistance information. For example, some users may want help quickly, while other users may want to try to discover actions on their own. Accordingly, user assistance managers 106 associated with different instances of software applications running on different devices (or multiple instances on a single device) may accelerate the presentation of user assistance information to some users (e.g., may reduce the activity delay trigger and/or the resting period) while delaying the presentation of user assistance information to others (e.g., may increase the activity delay trigger and/or the resting period).

As described above, the user assistance manager 106 may obtain information about the user interface from the user interface manager 102. The user interface manager 102 may communicate information regarding what content is currently displayed in the user interface to the user assistance manager 106. The user interface manager 102 may communicate a position of each content item currently displayed in the user interface. The user interface manager 102 may communicate device information to the user assistance manager 106, such as the resolution or display size of the user interface as presented on the device. The user assistance manager 106 may determine where to present the new user assistance information in the user interface based on the information provided by the user interface manager 102. For example, the user assistance manager 106 may present new user assistance information in a way that does not interfere with an action being performed, the content associated with the action, and/or other specific content displayed in the user interface.

As described above, the system 100 may include a data storage manager 108. The data storage manager 108 may store user profile information 110 representative of information associated with one or more users, user interaction information 112 representative of information associated with user interactions, and user assistance information 114, such as user assistance information associated with one or more actions available within a software application, each of which may contain data contained, managed, generated, and/or used by the system 100. In some examples, at least a portion of the user profile information 110, user interaction information 112, and/or user assistance information 114 may be received from a social-networking system. Additionally or alternatively, the user experience tracker 104 and the user assistance manager 106 may communicate with the data storage manager 108 to store, access, and/or use data in the user profile information 110, user interaction information 112, and user assistance information 114. In addition, the data storage manager 108 may maintain additional information. For example, the data storage manager 108 may maintain user data and/or authentication data that allows the system 100 to interface and communicate with a social-networking system. The data storage manager 108 may be configured to maintain additional or alternative data as may serve a particular implementation.

In one implementation, data storage manager 108 may store information representative of a list of actions that have been successfully performed by a user, a list of actions for which user assistance information has been presented to the user, a list of actions for which no user assistance information has been presented to the user, a list of actions for which user assistance information has been actively or passively dismissed by the user, and any other information associated with a user's interactions with one or more software applications.

The information stored by data storage manager 108 may be accessed to obtain data for use in the system 100. The stored information allows data for the system 100 to be used in new instances of the user interface, for example, if the user interface is closed and reopened. In one implementation, the stored information may persist even if an application or an instance of a user interface corresponding to the system 100 is uninstalled or removed from a computing device. If the user reinstalls the application or initiates a new instance of the user interface on the computing device, the data stored in the stored information may be used to continue the user's experience with the user interface by retaining a record of actions that have been performed previously and user assistance information that has been presented previously.

In some embodiments, the information stored by data storage manager 108 may be stored remotely to allow the data to persist even if the application or instance of the user interface has been removed from the user computing device, or if the user installs the application or initiates a new instance of the user interface on a different computing device. The stored information may also be used to sync multiple instances of the application or user interface with a plurality of devices to provide a single experience across the plurality of devices. For example, if the user has already performed actions within the user interface on a first device and starts using the user interface on a second device, user assistance information for actions already performed on the first device will not be displayed, and vice versa. The stored information may be synced according to a specified update schedule, or updated dynamically in response to user interactions, user input, and/or received data from one or more sources outside of the system 100 (e.g., a social-networking system).

Figure 2:
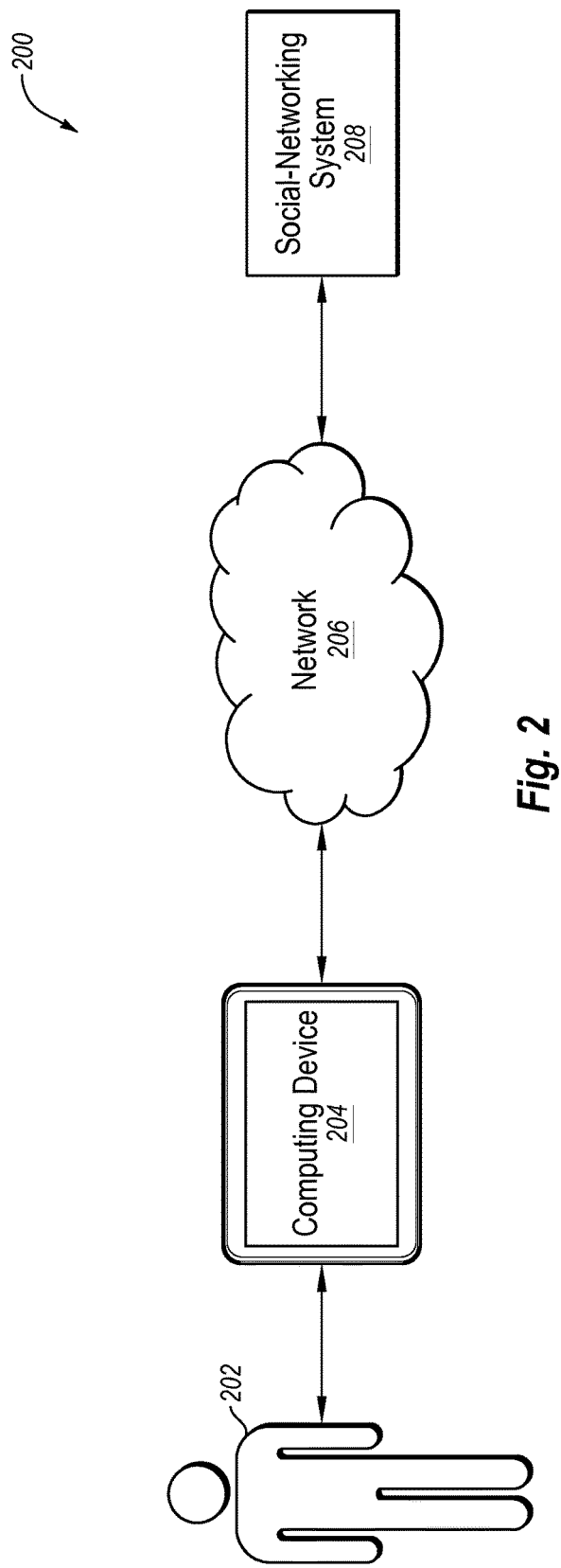
FIG. 2 illustrates an example environment in which the methods and system for providing a user interface may be implemented according to principles described herein.

FIG. 2 illustrates an example system 200, within which example embodiments of a new user assistance system (e.g., system 100) may be implemented. The system 200 may include a user 202, a computing device 204, a network 206, and a social-networking system 208. The computing device 204, the network 206 and the social-networking system 208 may be communicatively coupled, as illustrated in FIG. 2. Although FIG. 2 illustrates a particular arrangement of the user 202, the computing device 204, the network 206, and the social-networking system 208, various additional arrangements are possible. For example, the computing device 204 may directly communicate with the social-networking system 208, bypassing network 206.

The computing device 204 and social-networking system 208 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, the computing device 204 and social-networking system 208 may communicate via the network 206, which may include one or more networks, including, but not limited to, wireless networks (Wi-Fi networks), (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the computing device 204 and social-networking system 208. Communications between the computing device 204 and social-networking system 208 may be transported using any one of the above-listed networks, or any combination or subcombination of the above-listed networks. While FIG. 2 shows the computing device 204 and social-networking system 208 communicatively coupled via the network 206, it will be recognized that the computing device 204 and the social-networking system 208 may be configured to communicate one with another in any other suitable manner (e.g., via a direct connection).

As illustrated in FIG. 2, the system 200 may include the user 202. For example, the user 202 may be an individual (i.e., human user). Although FIG. 2 illustrates only one user 202, it is understood that the system 200 may include a plurality of users, with each of the plurality of users interacting with the social-networking system 208 through a corresponding plurality of computing devices. For example, the user 202 may interact with the computing device 204 for the purpose of generating, browsing or navigating electronic communications (e.g., social-network posts) and/or content associated with the electronic communications. The user 202 may interact with the computing device 204 by way of a user interface on the computing device 204. For example, the user 202 may utilize the user interface to cause the computing device 204 to open, close, expand, minimize, browse, or otherwise modify and/or interact with content displayed in the user interface.

The social-networking system 208 may generate, store, receive, and transmit social-networking data, such as social-network posts, messages, videos, images or other content generated or sent by the user 202. User-generated content may be displayed in the user interface on the computing device 204. User-generated content may be received by the social-networking system 208 and sent to other computing devices for viewing or browsing by other users. Additional information associated with example components of the social-networking system 208 is provided below in relation to FIG. 9.

Figure 3:
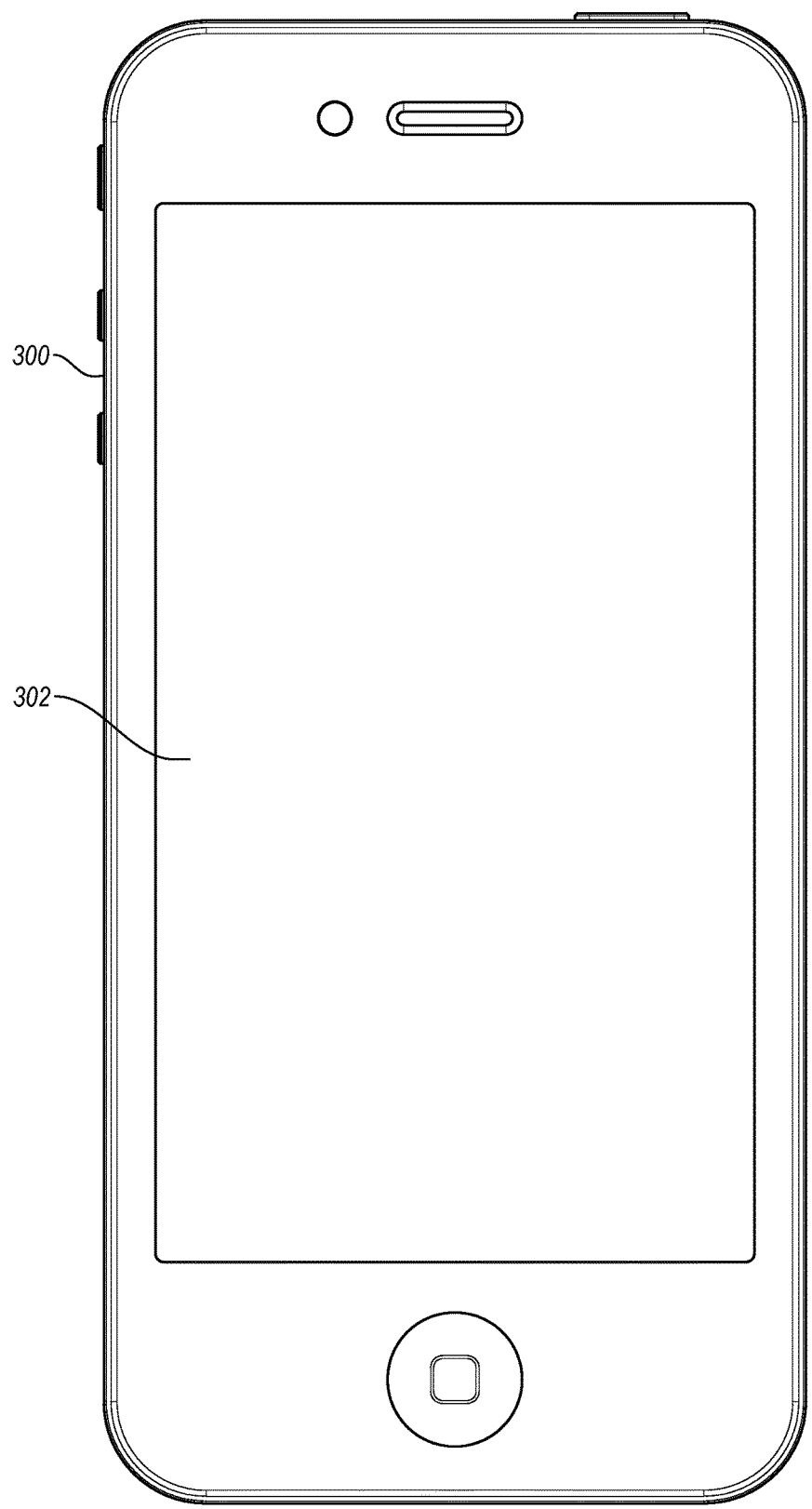
FIG. 3 illustrates an example computing device, in which the system of FIG. 1 may be implemented according to principles described herein.

In some examples, the system 100 may be implemented partially or entirely on a computing device. For example, FIG. 3 illustrates an example computing device 204 that may implement one or more of the components 102-108 of the system 100. For example, the computing device 204 may perform one or more operations associated with the presentation, processing, and/or management of user assistance information associated with a software application (e.g., a software application running on the computing device 204).

In FIG. 3, the computing device 204 is a mobile phone device 300 (e.g., a smartphone). However, in other implementations, the system 100 may be implemented by any other suitable computing device, such as, but not limited to, a tablet device, a handheld device, a laptop or desktop computer, a personal-digital assistant device, and/or any other suitable computing device capable of implementing one or more of the processes and/or operations described herein. As illustrated in FIG. 3, the computing device 204 may include and/or be associated with a touch screen 302 by way of which a user interface may be presented and/or by way of which user input may be received and/or detected. Additionally or alternatively, the computing device 204 may include any other suitable input device (e.g., a keypad, one or more input buttons).

In some examples, a user may utilize the touch screen 302 to provide one or more touch gestures, interact with a user interface, and/or access content item information. To illustrate, a user may utilize the touch screen 302 to browse, navigate, select, or otherwise interact with content items presented in the user interface. For example, a user may utilize the touch screen 302 to expand or minimize a content item, cycle through content in a list of content items, cycle through categories of content lists, or perform other actions relating to content presented in the user interface.

Regardless of the computing device, the new user assistance system 100 may be implemented using a variety of systems and methods. FIGS. 4A-4D illustrate example views of a graphical user interface for a software application, specifically a mobile social-networking application.

Figure 4A:
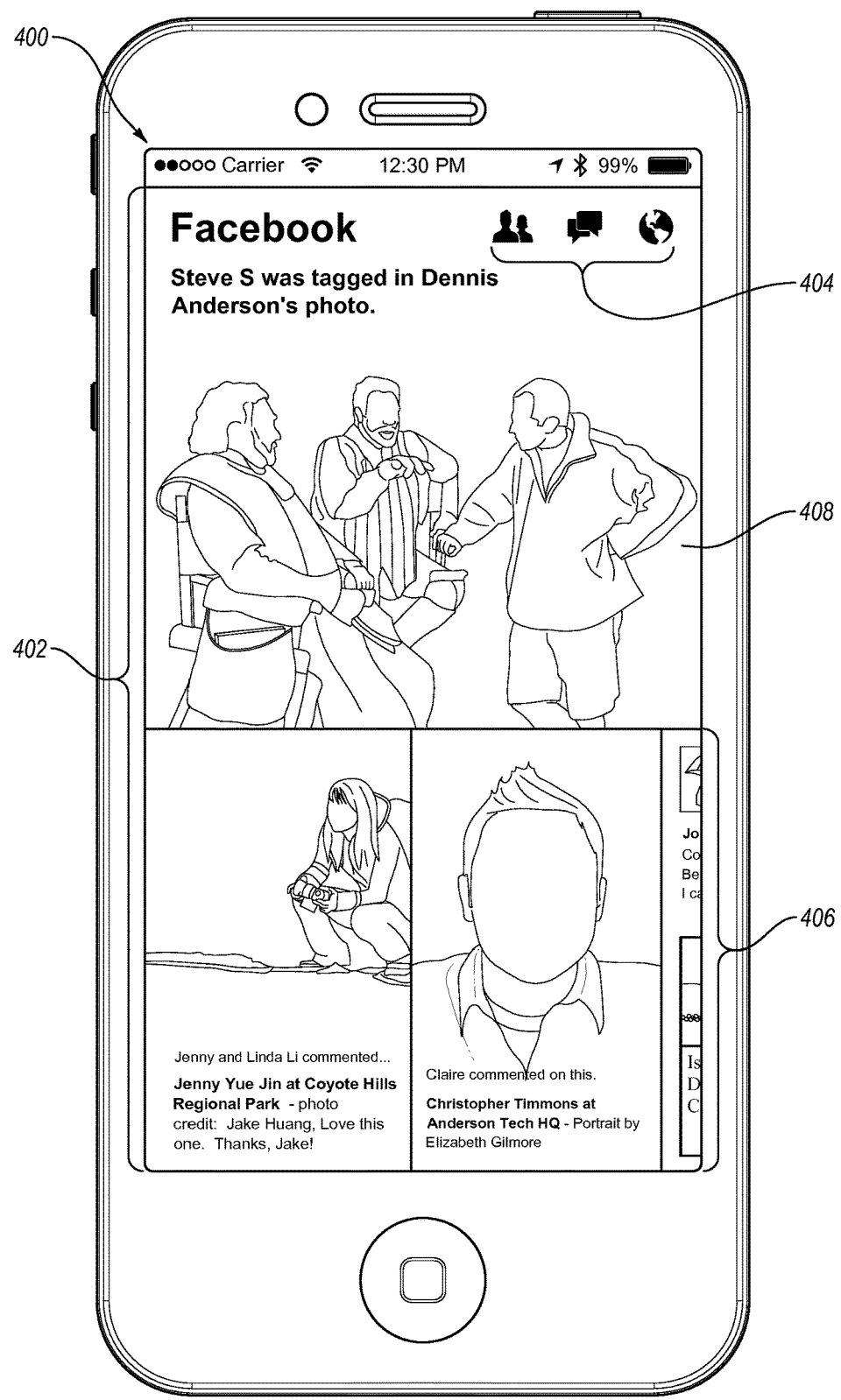
FIGS. 4A-4D illustrate example views of a graphical user interface according to principles described herein.

FIG. 4A illustrates an example of a graphical user interface 400 (or simply "user interface 400"). For example, when a user enters the user interface 400, the user interface 400 may present the user with a current view 402 illustrated in FIG. 4A. As shown, the user interface 400 may present a plurality of content items. The content items may include posts, images, articles, or other content. The user interface 400 may also include one or more icons 404 in at least a portion of the current view. The icons 404 may be used to access specific content, options, or views in the user interface 400. For example, the icons 404 may respectively open up a list of contact requests, a messaging option, a notification display, or access other features within the user interface 400.

The user interface 400 presents content in a current view 402, which includes anything currently visible to the user. The current view 402 illustrated in FIG. 4A may be an initial view. For example, the current view 402 may include a horizontal list of content items 406 located toward the bottom of the user interface 400. The list of content items 406 may represent a stream or feed of content specific to the user of the computing device. For example, the list of content items 406 may be a list of social-network posts, which may include text, images, videos, or any other content posted to a social-networking system and included in the user's feed. A highlighted content item 408 may be displayed on the remaining portion of the user interface 400 located toward the top of the user interface 400. The highlighted content item 408 displayed at the top of the user interface 400 may be a recent social-network post being emphasized for one or more reasons (e.g., based on a popularity of the post or on a likelihood that the user will like the post). In one implementation, the current view 402 shown in FIG. 4A may represent an initial view of the software application presented to the user when the user utilizes the software application for the first time. In additional or alternative embodiments, the user interface 400 may present content according to a different layout than described above, or present content other than that described above in an initial view.

As will be discussed in more detail below, the user may interact with the various content items displayed in the current view 402 by performing one or more actions available within the current view 402. In particular, the user may perform one or more actions using touch gestures within the touchscreen and relative to content displayed within the current view 402. For example, the user may select a content item using a tap gesture on or near the item. Additionally, the user may expand a content item from the list of content items 406 by tapping and holding on the selected item and dragging upward to expand the content item to fill in the user interface 400. Alternatively, the user may expand the highlighted content item 408 by tapping on the highlighted content item 408. The user may perform other actions available for user interaction within the user interface 400 by performing other types of gestures or inputs. For example, the user may "swipe" horizontally (left-to-right or right-to-left) on the list of content items 406 to browse the items in the list of content items 406 that may not be displayed in the current view 402. The user may swipe horizontally on the highlighted content item 408 to change a category of content displayed in the current view 402, for example, to display content specific to particular categories (e.g., sports, news, technology, etc.). The user may tap on one of the icons 404 to open corresponding content or options. Other types of actions may be available for user interaction and other types of content may be displayed within the user interface 400. Although the figures present views of an example mobile application, one will appreciate that the principle described herein may be applied within any software application including any type of content or actions available to the user.

While the user may interact with content items in the user interface 400, a new user may not know which gestures correspond to which actions available for user interaction within the current view 402, or how to perform the gestures associated with the available actions. To provide the user assistance information in a way that helps the user learn to navigate within the user interface 400 and to interact with the various content without interrupting the natural flow of the user's experience, the system 100 may determine that a certain amount of time has passed without any actions being performed in the current view 402. For example, when the user is first presented with a highlighted content item 408 and a list of content items 406 in the current view 402, the user may not be aware of gestures to navigate the list of items 406 or otherwise interact with the content items displayed. The user may hesitate before attempting to perform any gestures to navigate or interact with the content. Based on the activity disruption, based on, for example, a corresponding predetermined delay threshold (or other determination of disruption), the system 100 may present user assistance information associated with a particular action available within the current view 402.

As described in more detail above, the system 100 may determine which user assistance information to present based on a set of actions available within the current view 402, and a priority assigned to each of the actions. For example, the system 100 may select the action with the highest priority. When the system 100 determines which user assistance information to display, the selected user assistance information is presented within the current view 402 to assist to user in performing the corresponding action.

Figure 4B:
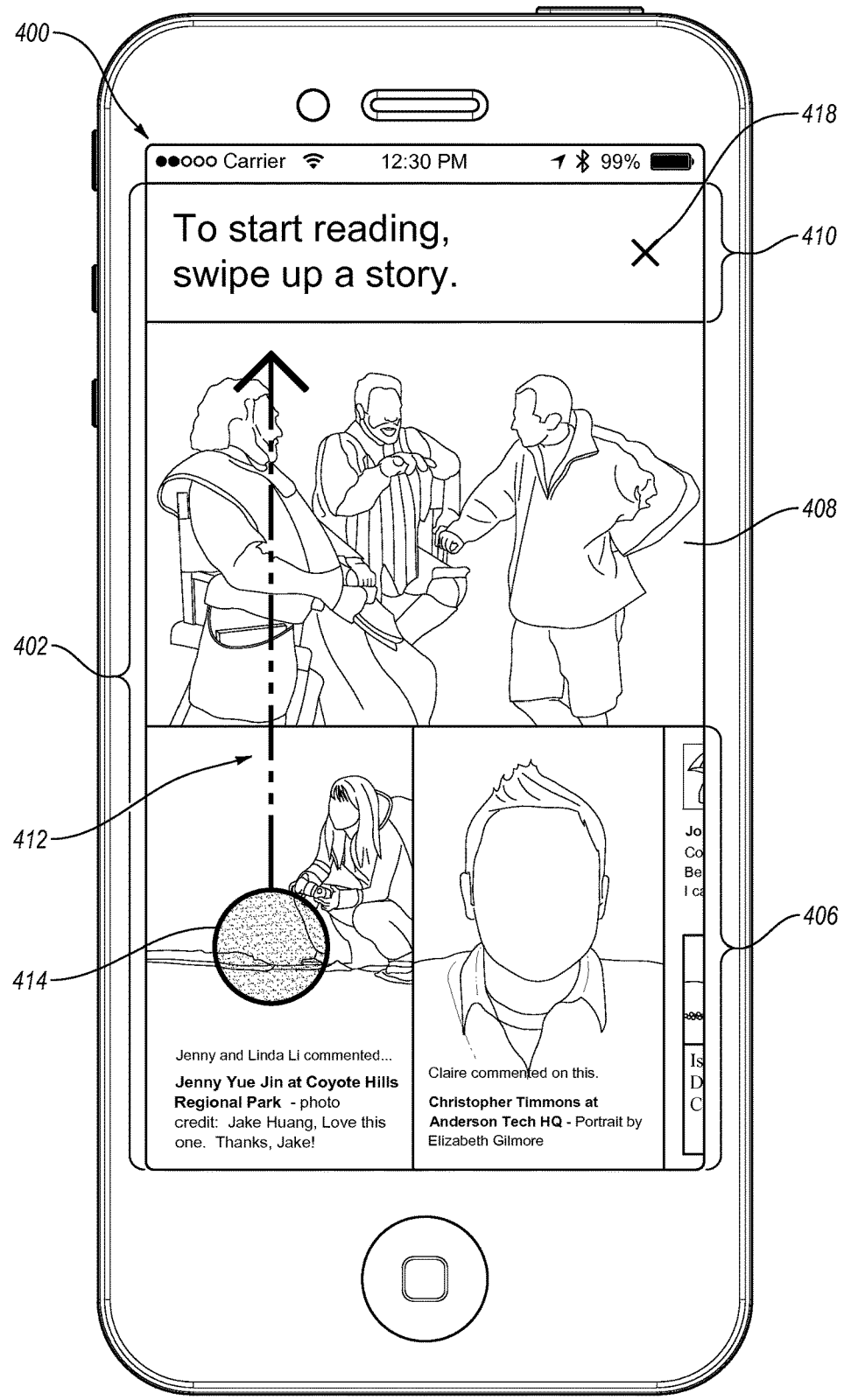

FIG. 4B illustrates an example of presenting user assistance information associated with an action available within the current view. The user assistance information may include text, images, video, speech, animations, and/or other content to aid the user in learning and performing the action. In particular, as illustrated in FIG. 4B, the system 100 can present instructions 410 for performing the action and a graphical animation 412 of the action. In the illustrated example, the user assistance information (collectively the instructions 410 and the animation 412) is configured to teach the user how to open or expand a content item from the list of content items 406.

As illustrated in FIG. 4B, the instructions 410 can include text describing how to perform the action (e.g., "To start reading, swipe up a story"). The instructions 410 may be presented in a location in the current view 402 that is not displayed over the specific content item and/or does not interfere with the corresponding action. In some examples, the instructions 410 may overlap at least a portion of the content item and/or a path corresponding to the current action. Additionally, the instructions 410 may display a message indicating additional encouragement as the user attempts to perform an action, for example, "Continue swiping upward."

As mentioned above, the user assistance information may also include an animation 412 showing the user how to perform the action. For example, the animation 412 can include a circle 414 that appears and moves through the current view 402 to illustrate a touch gesture to be performed by the user. To illustrate, the circle 414 can appear over the content item associated with the action to represent where the user should begin the touch gesture (e.g., where the user's finger should land on the touchscreen). The circle 414 may move along a path corresponding to the specific action. For example, as illustrated in FIG. 4B, the circle may follow an upward path to instruct the user to drag the selected content item upward to expand the content item. Thus, the animation 412 for the circle shows the circle 414 beginning or landing over the social-network post and moving along an upward path in the current view 402. The animation 412 may play in a loop until the user begins to perform the corresponding action. Alternatively, the user may choose to dismiss the user assistance information by selecting the dismissal option 418.

Although the action is illustrated and described using a circle, an action may be represented in any suitable manner. For example, the action may be represented using any type of shape, more than one shape, more than one animation, any number of frames in an animation, a video demonstration of a user performing the action, an audio clip describing the action, one or more audible sounds accompanying the user assistance information, or any other suitable method for teaching a user how to perform the action, or any combination thereof.

Figure 4C:
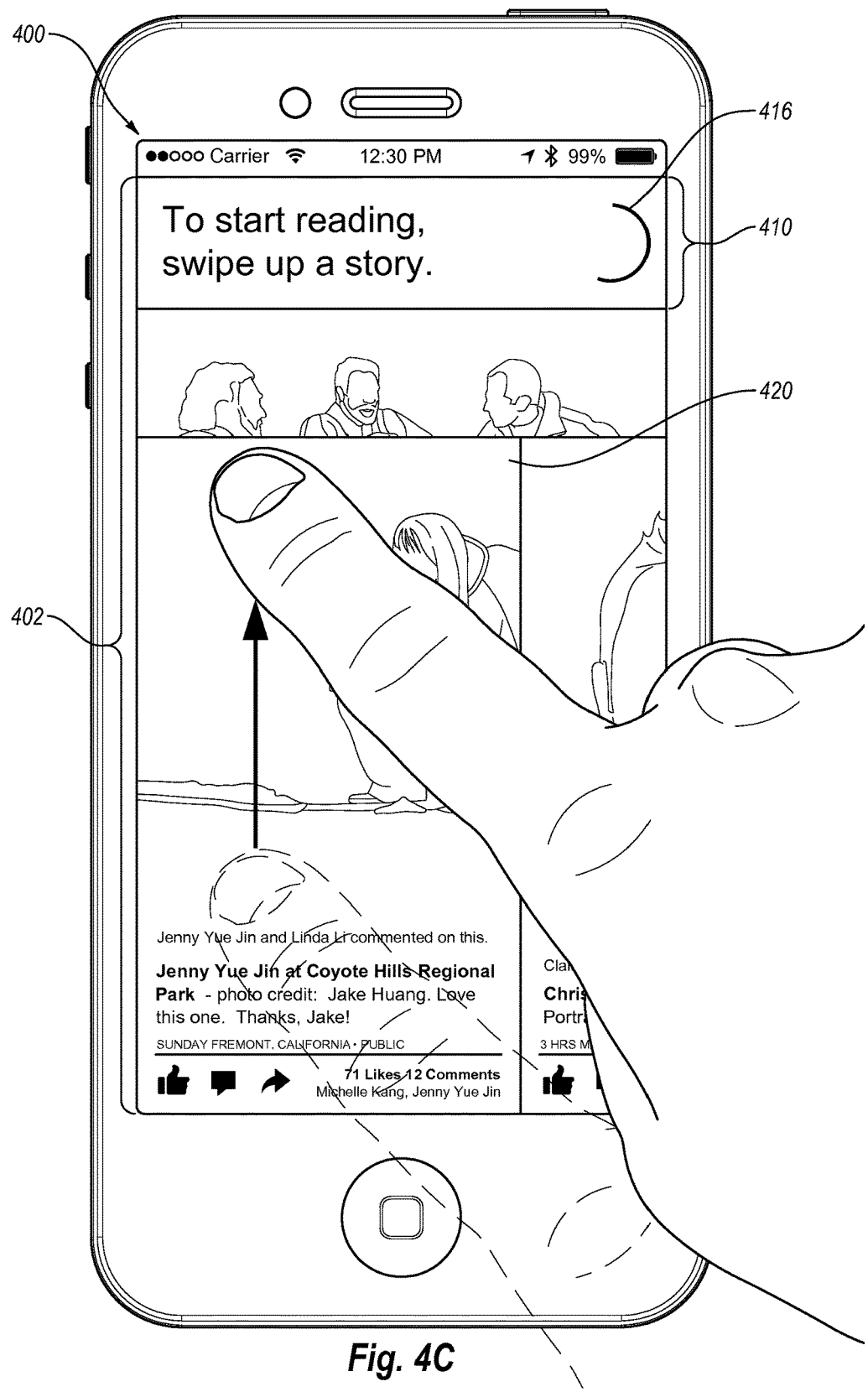

If the user begins to perform the action, the user assistance information may be modified to assist the user as the user completes the action. For example, once the user begins to perform the action, the animation 412 may stop and be hidden from the current view 402, as shown in FIG. 4C, which illustrates the user in the process of performing the instructed action. The arrow shown in FIG. 4C represents a movement path corresponding to the user's performance of the action and is not displayed in the user interface 400. In particular, the user has selected a content item 420 from the list of content items 406 and is dragging the content item 420 upwards to expand the content item within the current view 402. As illustrated, when the user begins the action, an action progress indicator 416 associated with the action may be used to reflect the accumulated progress and/or successful completion of the action. The action progress indicator may be represented in any way that allows the user to easily determine whether the user is accurately performing the corresponding action, and how much of the action remains before completion. An action may be a discrete action or a continuous action. The action progress indicator 416 may be presented differently for discrete actions and continuous actions.

A discrete action may require a one-time gesture to fully complete the action, such that the action is never only partially complete. One example of such an action may include a tap gesture used to select an item or option. The action progress indicator 416 shows that the action is complete by presenting a completion message or other completion indicator. Because a discrete action does not have partial completion, the action progress indicator may not present accumulated progress for the action, only that the action is successfully completed.

A continuous action may require one or more gestures and may be only partially complete at any given time. The action progress indicator 416 can present the accumulated progress for a continuous action. For example, if the user taps and holds a selected content item 420 and begins dragging or swiping upward, the action progress indicator 416 may be shown in the instructions 410, as indicated by a circle outline that is progressively completed as performance of the action progresses. When the action is halfway performed, the circle outline may be approximately halfway drawn to represent the accumulated progress of the action. Accordingly, if the user reverses the direction of the touch gesture—for example, by swiping back downward—the circle outline can also reverse to reflect the accumulated regression for the corresponding action. In another example, if the action is to tilt a mobile device, the completion indicator may show the accumulated progress (for example, a half circle) as the user tilts the mobile device in one direction, and complete the circle when the user tilts the mobile device in the other direction. In other examples, the accumulated progress may use other representations—such as a completion bar, a number showing the completion percentage, or any other suitable representation—to allow the user to easily see how much of the action is completed and/or how much of the action remains.

In addition to the action progress indicator 416, the user interface 400 may present an animation for the corresponding content as the action is being completed. For example, the selected content item 420 may expand in size, may graphically "unfold", may change position, or change in visual appearance in any other way as the user performs the action.

Figure 4D:
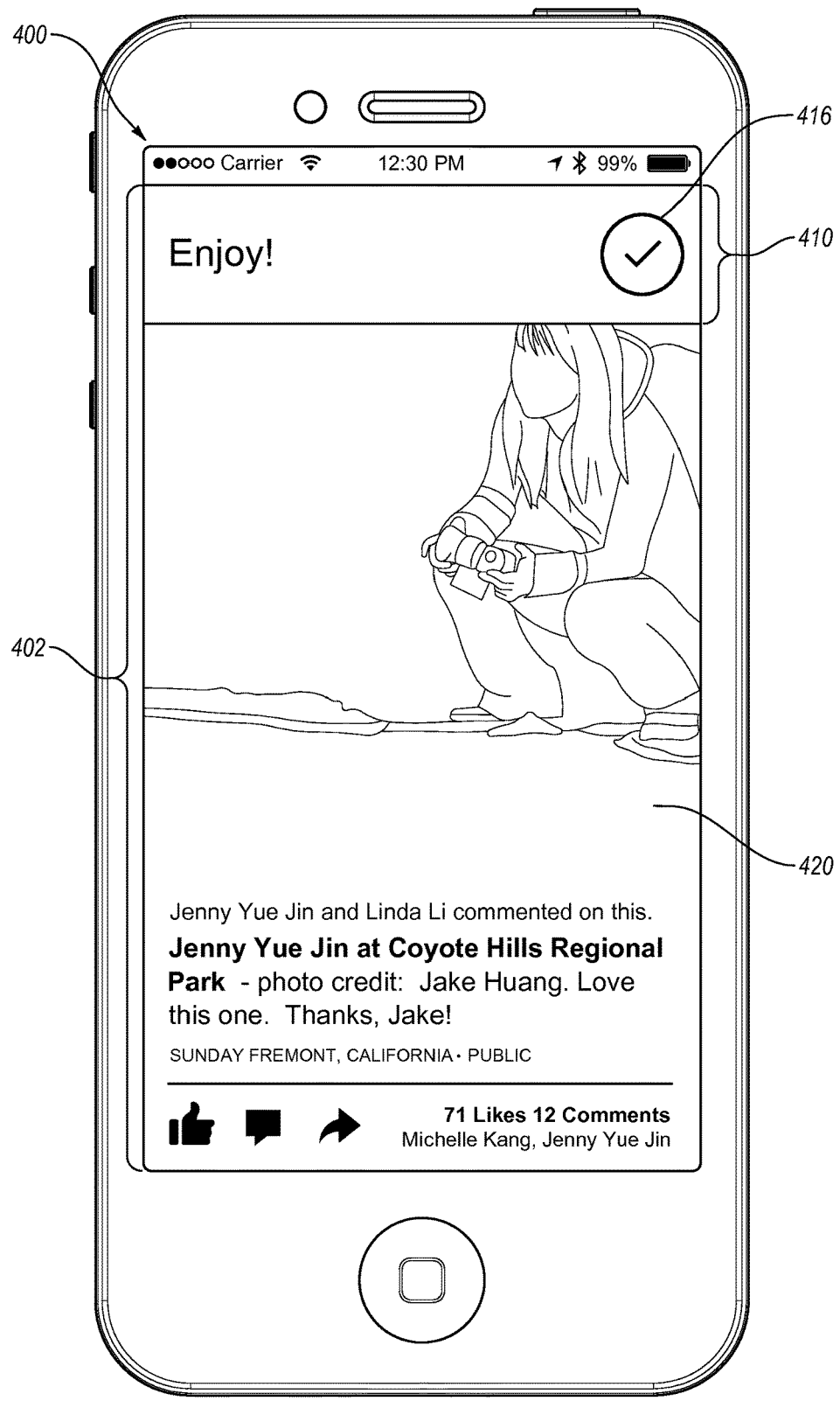

When the action is completed, the action progress indicator 416 may be updated to show that the action is completed, as illustrated in FIG. 4D. Using the example described previously, the action progress indicator 416 may show that the action has been completed successfully by displaying a fully drawn circle outline with a check mark inside the circle. The instructions 410 in which the action progress indicator 416 is displayed may also be updated to reflect that the action has been completed successfully. For example, the instructions 410 may display a description of the action prior to and during performance of the action. When the action is completed, the instructions 410 may display a congratulatory message or other message indicating that the action was completed successfully. The instructions 410 may also change color to indicate successful completion of the action, for example, by changing the text box from blue to green, or from any color to any other color. In one implementation, the action progress indicator 416 or instructions 410 may remain for a specific amount of time after successful completion of the action, and then may be hidden or closed automatically after the specific amount of time has passed.

After completion of the action, the current view 402 of the graphical user interface 400 may have changed. The updated view may be associated with a different set of actions that are available to the user. Accordingly, the next instance of user assistance information presented to the user may be specific to the updated current view 402. In one implementation, the user assistance information may include information relevant to a likely subsequent action within the current view 402. The likely subsequent action may be based on the recently completed action or on other criteria associated with the current view 402. The user assistance information may present information for the likely subsequent action in any way. For example, if the user expands a social-network post to a full screen view, the instructions 410 associated with the user assistance information may display text describing an action to exit the full screen view.

In one implementation, if the user does not successfully perform the indicated action, the instructions 410 corresponding to the user assistance information remain in the current view 402. The instructions 410 may remain until the action is completed or until the user assistance information is dismissed, whether passively or actively. In one implementation, if the user does not perform the indicated action successfully, an animation corresponding to the user assistance information reappears in the current view 402. The animation may reappear after a certain amount of time has passed since the user's last attempt to perform the action or another action. For example, if the user attempts to expand the content item 420, but does not successfully complete the action, the animation 412 demonstrating how the action is performed may be displayed in the user interface 400 again.

Each instance of user assistance information may be actively or passively dismissed by the user. In one example, user assistance information may be actively dismissed if the user chooses to actively dismiss the user assistance information without performing the action. For example, the user assistance information may display an "X" or other graphical artifact 418 as illustrated in FIG. 4B. The user may select the graphical artifact 418 by tapping on the graphical artifact 418, which causes the user assistance information (including any text or demonstration content associated with the user assistance information) to close or otherwise be hidden from the current view 402. In one implementation, when an instance of user assistance information is actively dismissed, the system 100 stores the corresponding action in a list of actively dismissed actions. The list of actively dismissed actions may be used to determine which actions should not be presented to the user again.

User assistance information may be passively dismissed in several ways. For example, the user assistance information may be passively dismissed if the user successfully performs an action other than the action corresponding to the new user experience indicator. To illustrate, if the new user action indicator 410 corresponds to an action to expand a content item, but the user performs an action to browse a list of content items or change the category of content items displayed, the new user action indicator 410 associated with the action to expand the social-network post may be passively dismissed. Additionally or alternatively, the user assistance information may be passively dismissed if the user interface 400 is closed. For example, if the user closes the user interface 400 or turns off the computing device, or if the user interface 400 is forced to close by another application or by the device, the user assistance information may be passively dismissed.

A passively dismissed instance of user assistance information may be presented to the user again, in response to a activity delay/disruption, at a later time, such as the next time the user encounters a view in which the corresponding action is available for user interaction. For example, the passively dismissed user assistance information may be presented to the user a second time in response to a second user activity delay/disruption in the current view.

In one implementation, the user assistance information may require the user to perform the corresponding action or to actively dismiss the user assistance information before the user is able to perform any other actions within the user interface 400. In another implementation, the user may be able to perform any actions associated with the current view 402 at any time, regardless of whether user assistance information is displayed in the current view 402.

As a general summary, FIGS. 4A-4D illustrate various examples of assisting a new user of the user interface 400.

Figure 5A:
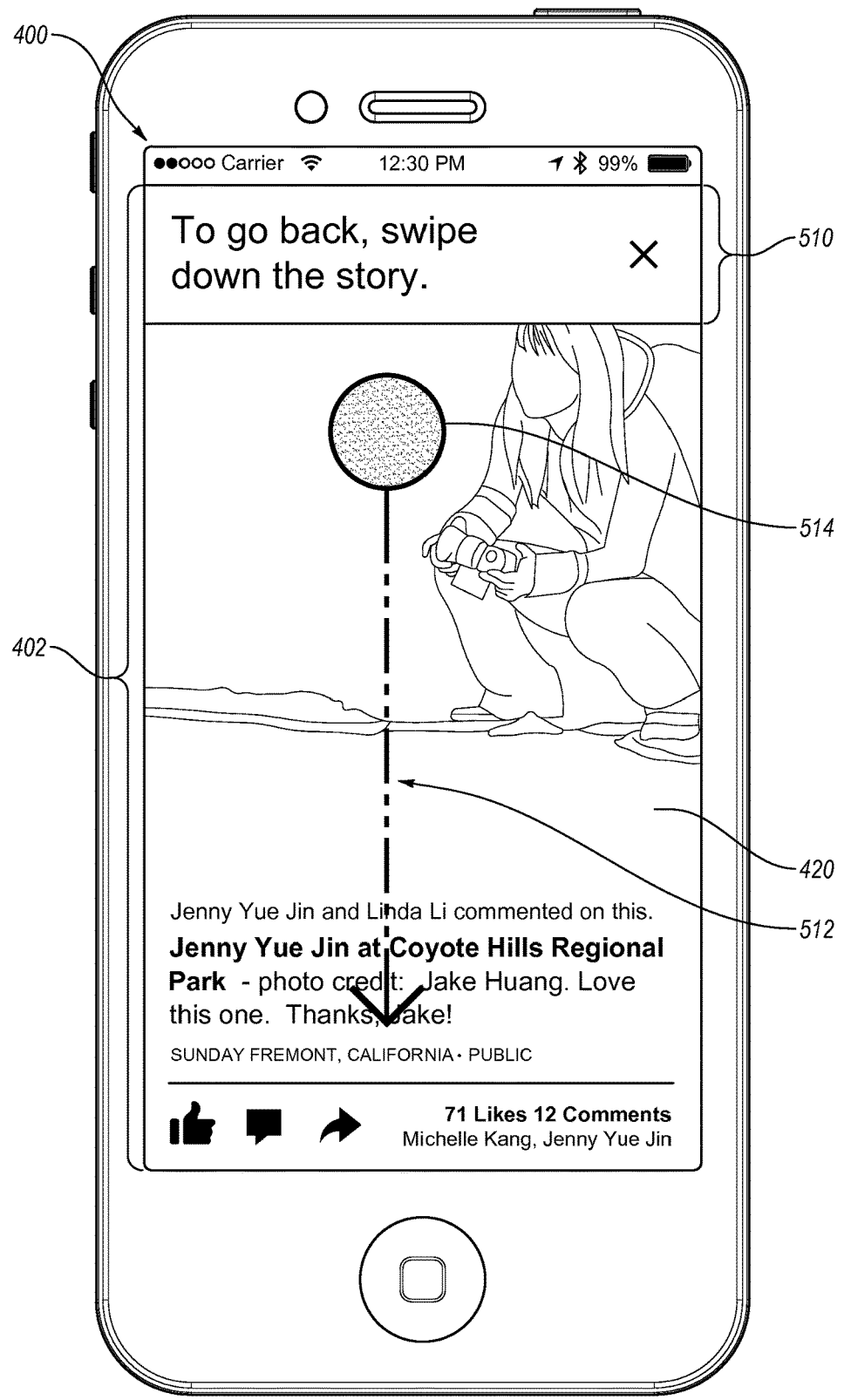
FIGS. 5A-5C illustrate additional example views of a graphical user interface according to principles described herein.
Figure 5B:
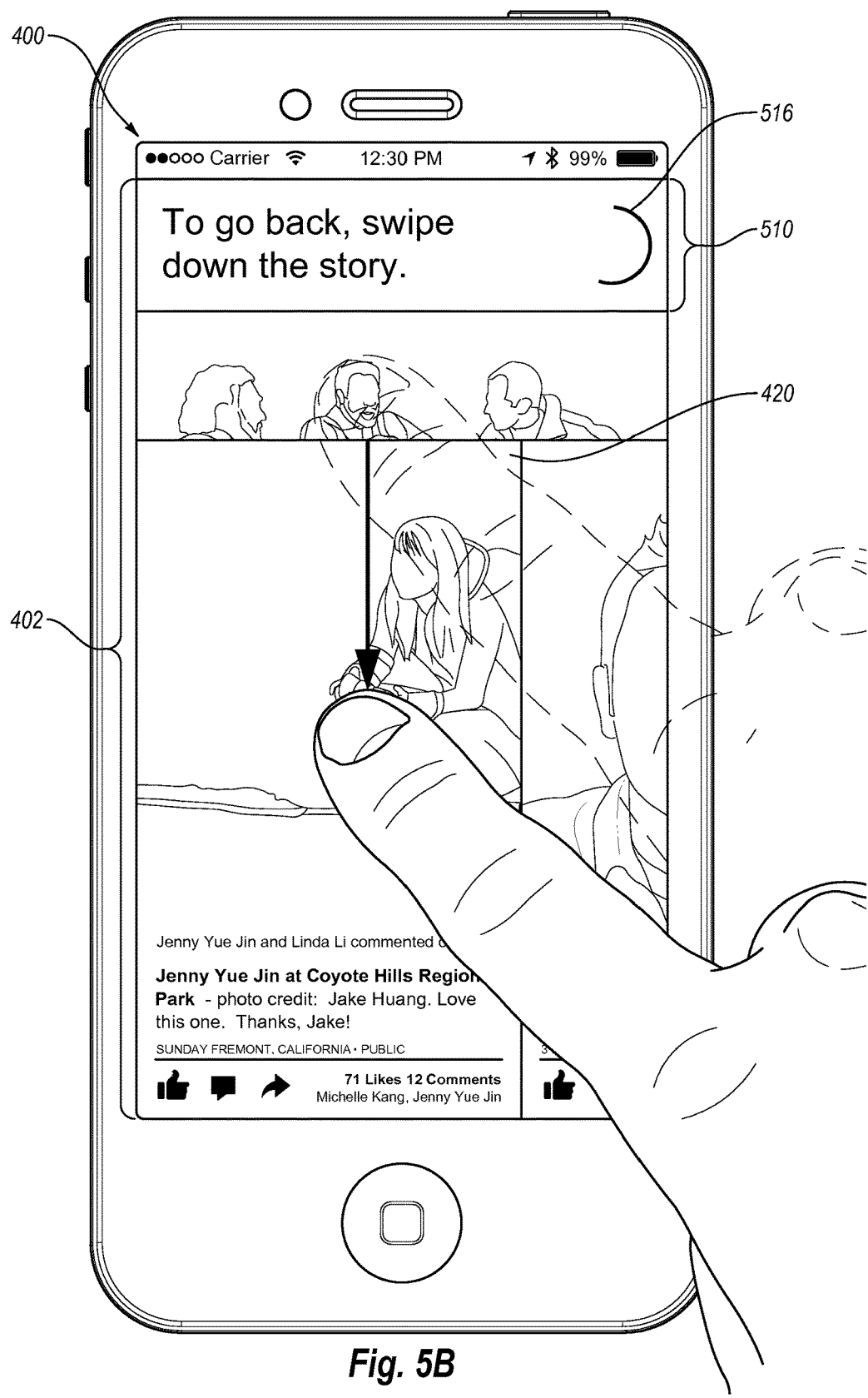
Figure 5C:
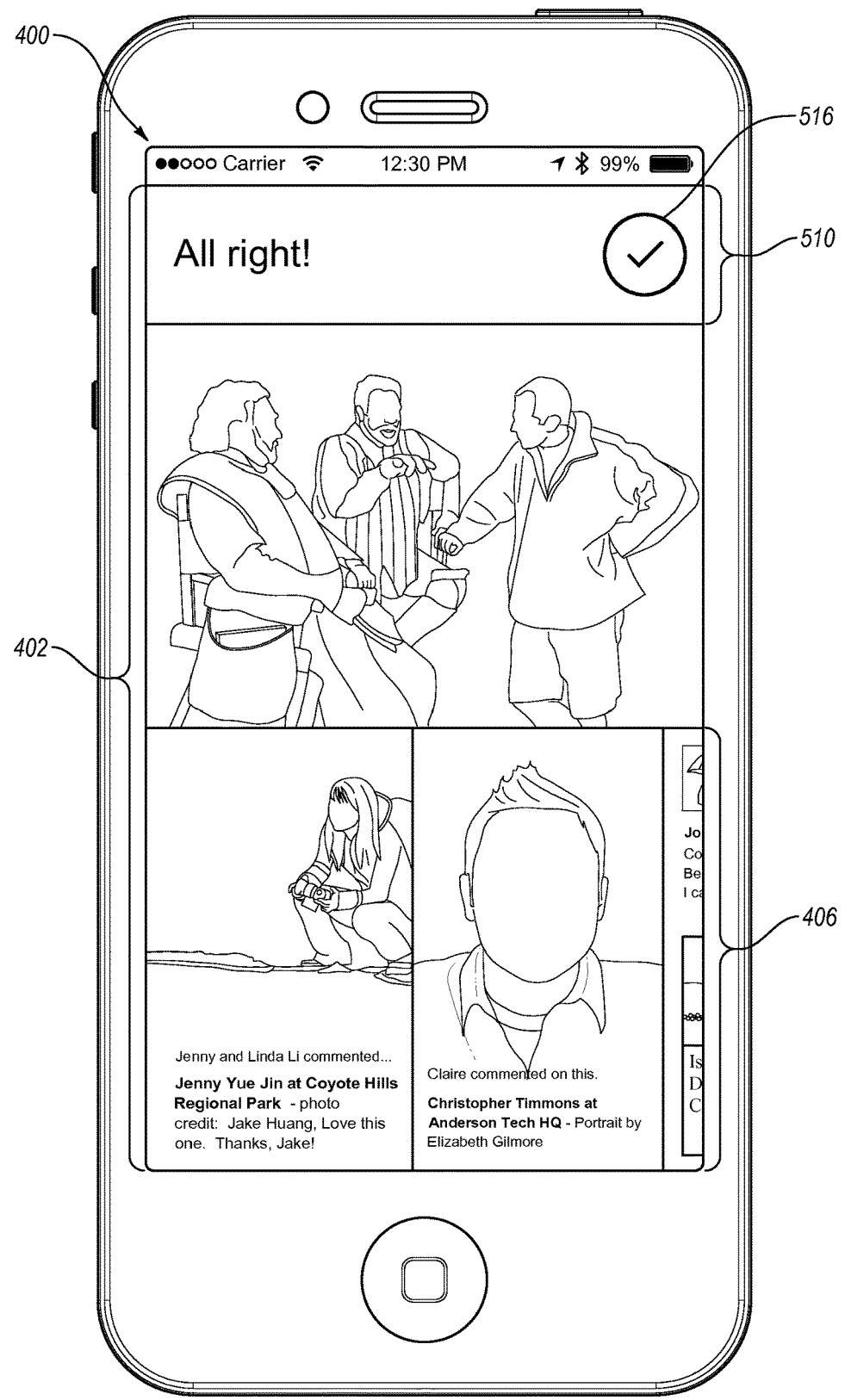

FIGS. 5A-5C illustrate an additional example of assistance for a new user of the user interface 400.

After a user has successfully completed an action associated with user assistance information, the user assistance information may be closed, as described previously. The action may modify the current view 402, thereby changing the actions available for user interaction.

To illustrate, when the user performs an action to open or expand a selected content item 420 to a full screen view, the user may not be able to interact with other content items that are no longer visible in the updated current view 402. As a result, the actions available within the current view 402 and the corresponding priorities assigned to the actions may be changed. For example, one or more actions previously available in a prior view may no longer be available in a current view. However, other actions that may not have been available previously may now be available. The currently available actions may be presented or taught to the user in accordance with a priority of the actions, as explained in more detail above.

When a new action is made available based on a previous user action, user assistance information may be displayed for the new action, as illustrated in FIG. 5A. The user assistance information may be displayed after an activity delay within the current view 402 as modified based on the previous user interaction. In one implementation, the system 100 also requires a certain amount of time to pass after user assistance information is closed before displaying additional user assistance information. Requiring a certain amount of time between displaying instances of user assistance information may prevent the system 100 from interrupting the natural flow of the user's experience, and from displaying help information too quickly or unnecessarily.

In one example, after expanding the selected content item 420, the user may be able to interact with the expanded content item and/or a list of content items in the full screen view by performing actions within the full screen view. For example, the user may perform a horizontal swipe gesture to view other content items from the list in the full screen view. In addition to browsing the list of social-network posts while in full screen view, the full screen view may introduce additional actions available for user interaction. For example, the user may scroll up and/or down within a currently expanded content to view content corresponding to the content item which may not be shown within the current view 402.

As the user performs actions within the user interface 400 that change the actions available for user interaction, the user may encounter additional actions that were not available previously. Accordingly, the user may not know how to perform certain actions available for the content displayed in the new view. When the system 100 detects an activity delay in the current view 402, the system 100 may determine which action to display user assistance information for based on the priority assigned to the actions available within the new view. Accordingly, the system 100 can present user assistance information for the action having the highest priority in the current view 402. As previously mentioned, user assistance information corresponding to actions that have already been performed may not be presented.

In one implementation, the user may perform actions while in the full screen view in order to view articles, images or other content available within the full screen view. For example, the user may open a linked article or image within the full screen view of a selected content item 420. In one implementation, when the user has finished discovering a certain number of actions within the current view 402, the system 100 may present user assistance information corresponding to an action to close, exit, or otherwise modify which content is displayed in the current view 402. For example, the system 100 may present user assistance information describing and/or demonstrating how to exit the full screen view and to return to content in a previous view, as illustrated in FIGS. 5A-5C.

To illustrate, FIG. 5A shows an instance of user assistance information associated with an action to close the content item or exit the expanded view of the content item. The user assistance information can include instructions 510 describing the action associated with the user assistance information. For example, the instructions 510 include text describing how to exit a full screen view for a selected content item 420 to return to a previous screen or view. The instructions 410 may be displayed in any location within the user interface 400, for example, at the top of the user interface 400 or at the bottom of the user interface 400.

The user assistance information may also include an animation 512 demonstrating the action. For example, the animation 512 may include a circle 514 appearing to land on the touchscreen at a starting point and then moving along a path corresponding to the action (as illustrated by the direction arrow). The path may begin anywhere in the full screen mode and follow a path downward within the user interface 400. Alternatively, the path may begin in the top half of the user interface 400 or near the top of the user interface 400 and follow a path downward within the user interface 400. The animation 512 may play in a loop until the user assistance information is dismissed or until the user begins the corresponding action. As described previously, although the action is illustrated and described herein using a circle 514, the action may be represented in any suitable manner.

If the user begins to perform the action at any time after the user assistance information is presented, the demonstration of the action may stop and be hidden from the current view 402, as illustrated in FIG. 5B. For example, if the action is to close a full screen view for a selected content item 420, when the user taps and holds in the selected content item 420 indicated by the circle 514, the animation 512 may stop, and the circle 514 may be hidden from the current view 402.

As illustrated in FIG. 5B, when the user begins the action, an action progress indicator 516 associated with the user assistance information may be presented to reflect the accumulated progress and/or successful completion of the action. Thus, as the user performs an action (along a path represented by the arrow, which is not displayed in the user interface 400) in the user interface 400 via a touch gesture, the action progress indicator 516 shows the accumulated progress of the action. When the action is completed, the action progress indicator 516 may be updated to show that the action is completed, as illustrated in FIG. 5C. The action progress indicator 516 may show that the action has been completed successfully by displaying a fully drawn circle outline with a check mark inside the circle or by any other means of indicating that the action is complete.

As shown in FIG. 5C, the user has now returned to an initial view of the user interface 400. When the user returns to the initial view (which becomes the current view 402) the system 100 may present user assistance information for another action that has not yet been performed previously by the user. For example, FIGS. 6A-6C illustrate user assistance information for an action corresponding to the initial view that had not previously been performed.

The system 100 can determine user assistance information to present based on the priority of remaining actions in the current view 402. As previously described, user assistance information associated with an action having a high priority may be presented before user assistance information associated with an action having a low priority. The priority may be based on various criteria, such as successful completion of the action, discoverability of the action, a display order of the actions, or other criteria. For example, if the system 100 determines that an action for changing the current view 402 from one section to another section has not already been performed, the system 100 can present user assistance information associated with the action, as illustrated in FIG. 6A. Alternatively, the system 100 may determine that a different action is less discoverable, such as opening a settings menu or viewing a contact list.

Figure 6A:
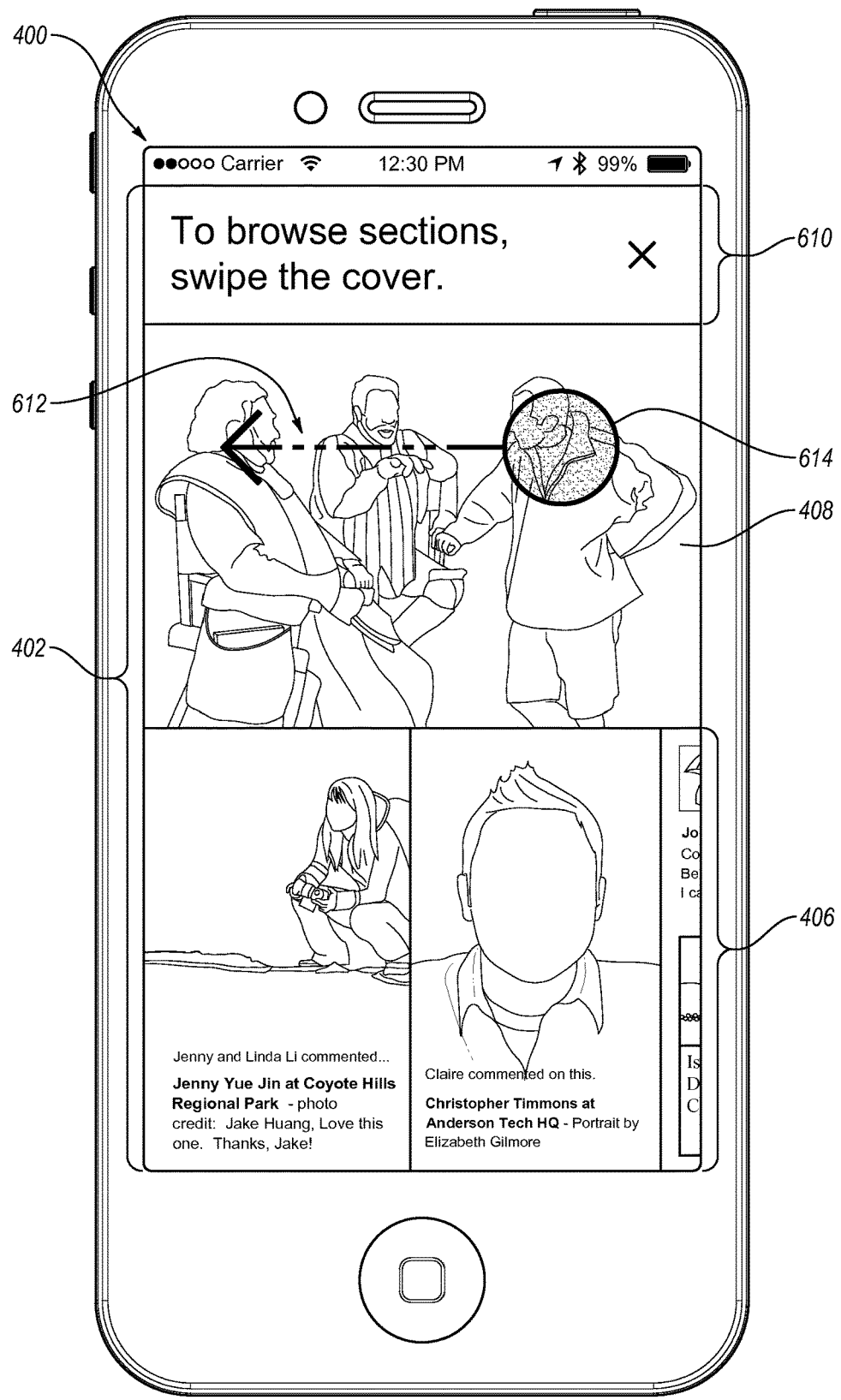
FIGS. 6A-6C illustrate additional example views of a graphical user interface according to principles described herein.
Figure 6B:
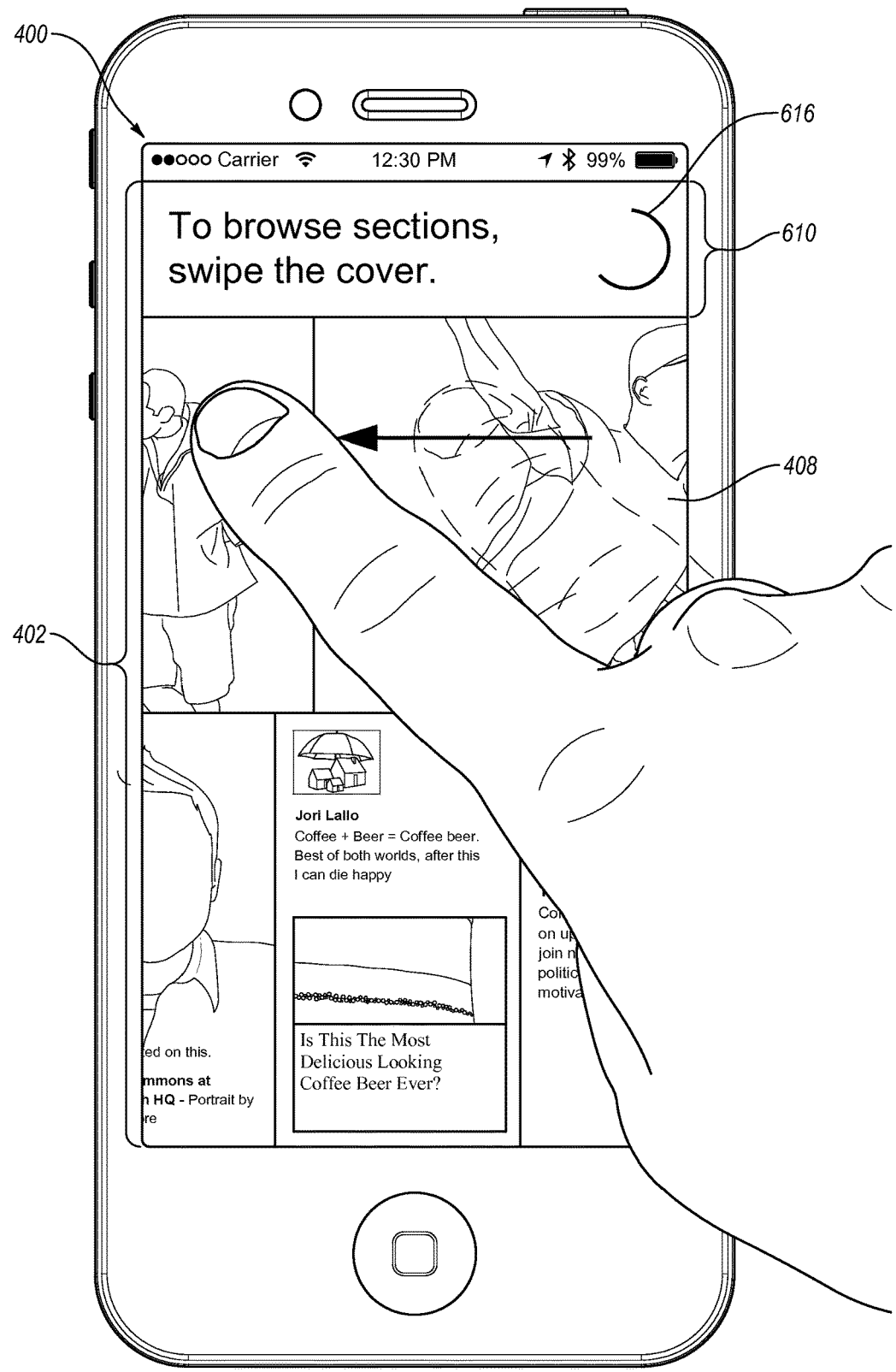
Figure 6C:
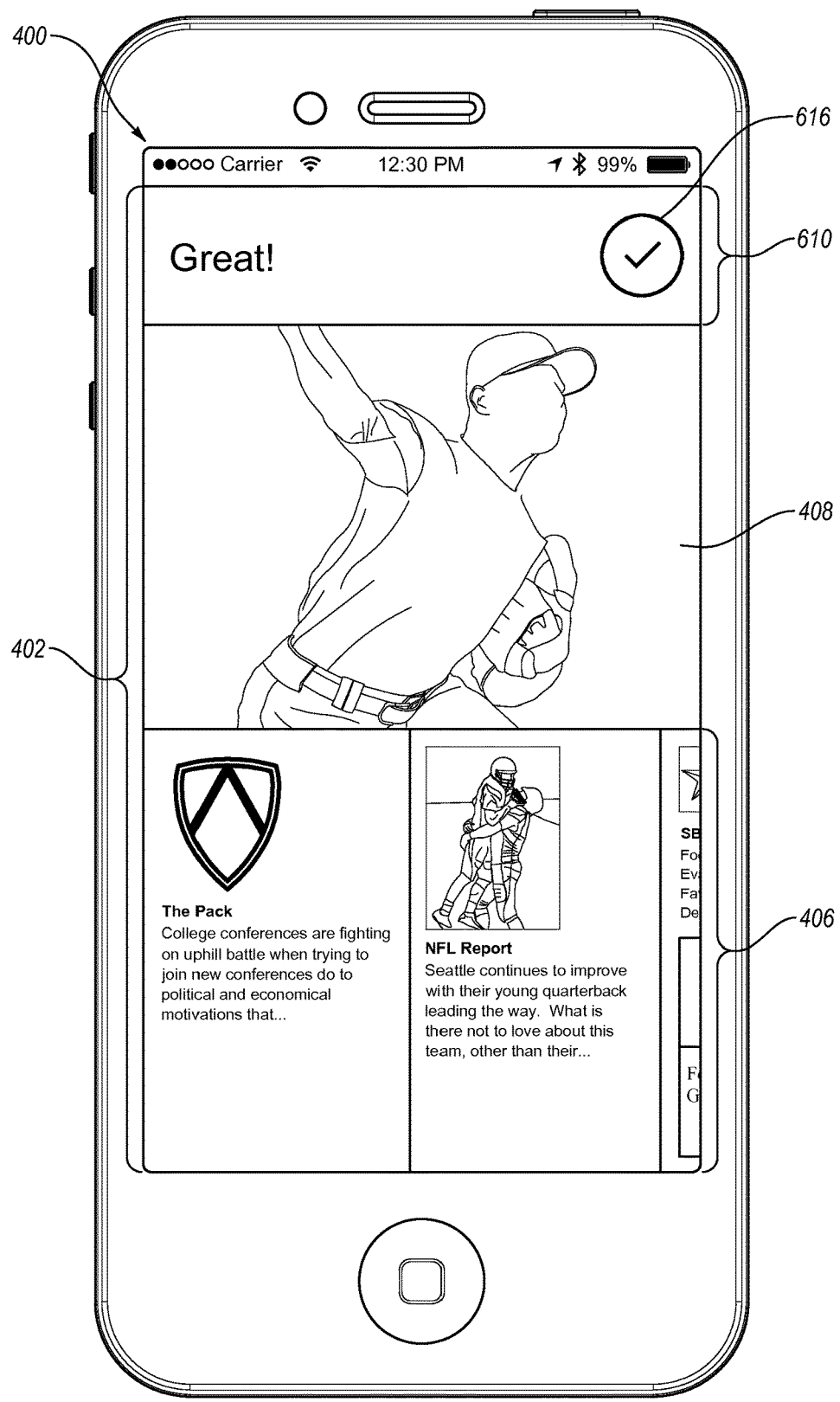

As with the actions previously described, the user assistance information corresponding to the action for changing the section displayed within the current view 402 may include instructions 610 describing the action and an animation 612 demonstrating the action, as illustrated in FIG. 6A. For example, the instructions 610 may describe how to browse sections by swiping the highlighted content item 408 to the left or right.

An animation 612 demonstrating the action of swiping the highlighted content item 408 to the left or right may also be presented. For example, the animation 612 may present a circle 614 located near an edge of the current view 402 in the highlighted content item 408 and moving toward the opposite edge of the current view 402 in a path corresponding to the action (as indicated by the direction arrow). The animation 612 may continue playing in a loop until the user begins performing the action associated with the user assistance information or another action in the user interface 400.

To begin the action to change the section category, the user may press a finger to the highlighted content item 408 and perform a swiping gesture in the direction as indicated by the animation 612. The user assistance information may include an action progress indicator 616 that displays the accumulated progress of the action, as illustrated in FIG. 6B. The highlighted content item 408 may also slide in the direction of the action performed by the user (along a path represented by the arrow, which is not displayed in the user interface 400) to illustrate the performance of the action. After the action to browse the section categories is completed, the action progress indicator 616 may display a check mark and the indicator 610 may present a message indicating that the action has been completed successfully, as illustrated in FIG. 6C.

If the user successfully completes all of the actions available for user interaction within the current view 402, the system 100 may discontinue presentation of user assistance information within that view. Similarly, if the user successfully completes all of the actions available for user interaction within the user interface 400 and/or actively dismisses all new user experiences for the user interface 400, the system 100 may discontinue presenting user assistance information altogether. In another implementation, user assistance information for actions that were previously presented or dismissed may be presented again if the system 100 determines that the user is having trouble or is stuck (e.g. based on activity delay information).

The system 100 may include a customizable setting to allow the user to determine whether the system 100 redisplays new user experience indicators 410. The system 100 may include a customizable setting to allow the user to determine whether to show any new user experience indicators 410, for example, if the user is an advanced user and prefers not to have any help information presented on the user interface 400. The system 100 may include other customizable settings to allow the user to determine other behaviors of the system 100.

Figure 7:
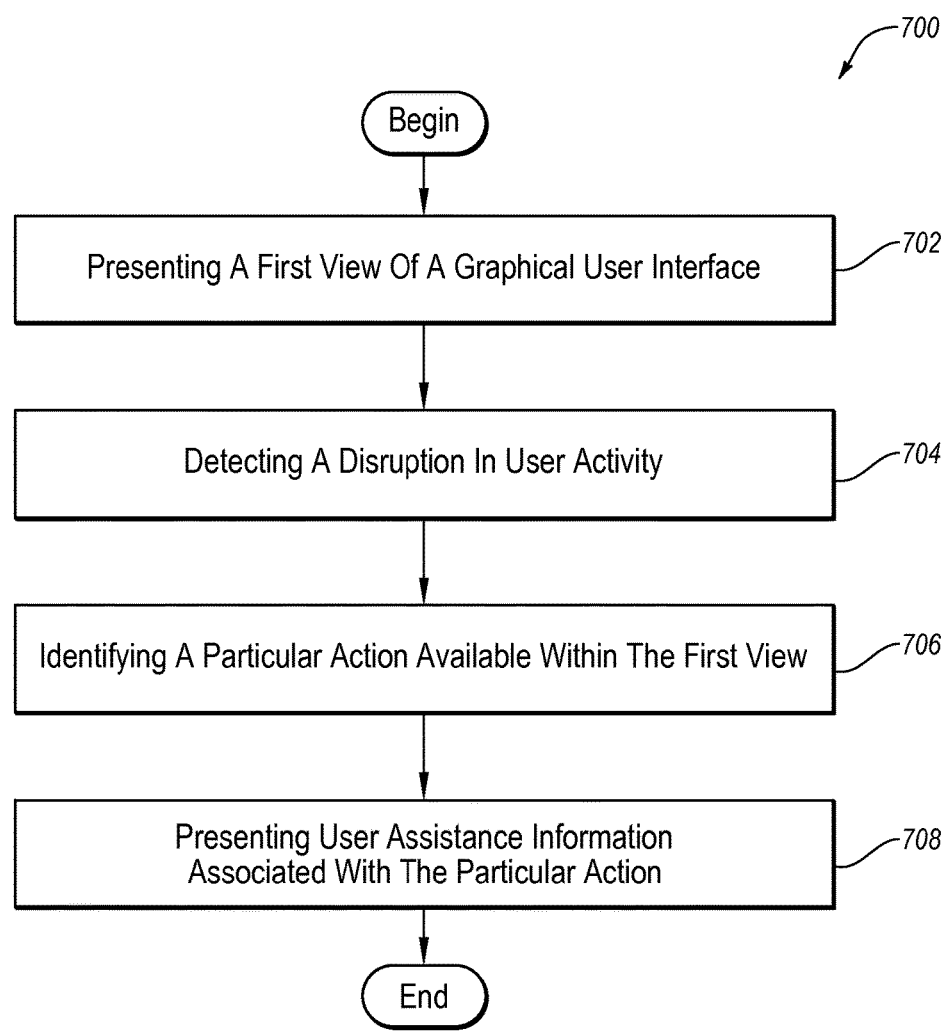
FIG. 7 illustrates an example method of assisting a user interface of a software application according to principles described herein.

FIG. 7 illustrates an example method 700 of assisting a user a new user experience in a user interface 400. While FIG. 7 illustrates example steps according to one embodiment, other embodiments may omit, add to, reorder, and/or modify any of the steps shown in FIG. 7. One or more of the steps shown in FIG. 7 may be performed by any component or combination of components of the system 100.

Step 702 may include presenting a first view of a graphical user interface. In particular, step 702 may include presenting a first view of a graphical user interface for a client application, wherein one or more actions are available to the user within the first view. For example, the system 100 may present a graphical user interface having a current view and an action available for user interaction as illustrated in FIGS. 4A-6C.

Step 704 may include detecting a disruption in user activity. In particular, step 704 may include detecting, using at least one processor, a disruption in user activity relative to the first view. For example, the system 100 may detect an activity disruption in the current view by determining that no user interactions or ongoing actions are being performed or have been performed within a predetermined time threshold as discussed in more detail above.

Step 706 may include identifying a particular action available within the first view. In particular step 706 may include identifying a particular action from the one or more actions available within the first view based on a prioritization of the one or more actions. For example, the actions may correspond to content items presented in the first view, and the priority may be predetermined based on actions already performed by the user and/or other criteria, as described herein.

Step 708 may include presenting user assistance information associated with the particular action. In particular, step 708 may include, in response to the detected disruption, presenting user assistance information associated with the particular action. For example, the user assistance information may include text, images, animations, videos, sounds, music, speech, or other graphical or audio representation that provides information related to a new user experience in the graphical user interface as illustrated in FIGS. 4A-6C.

Figure 8:
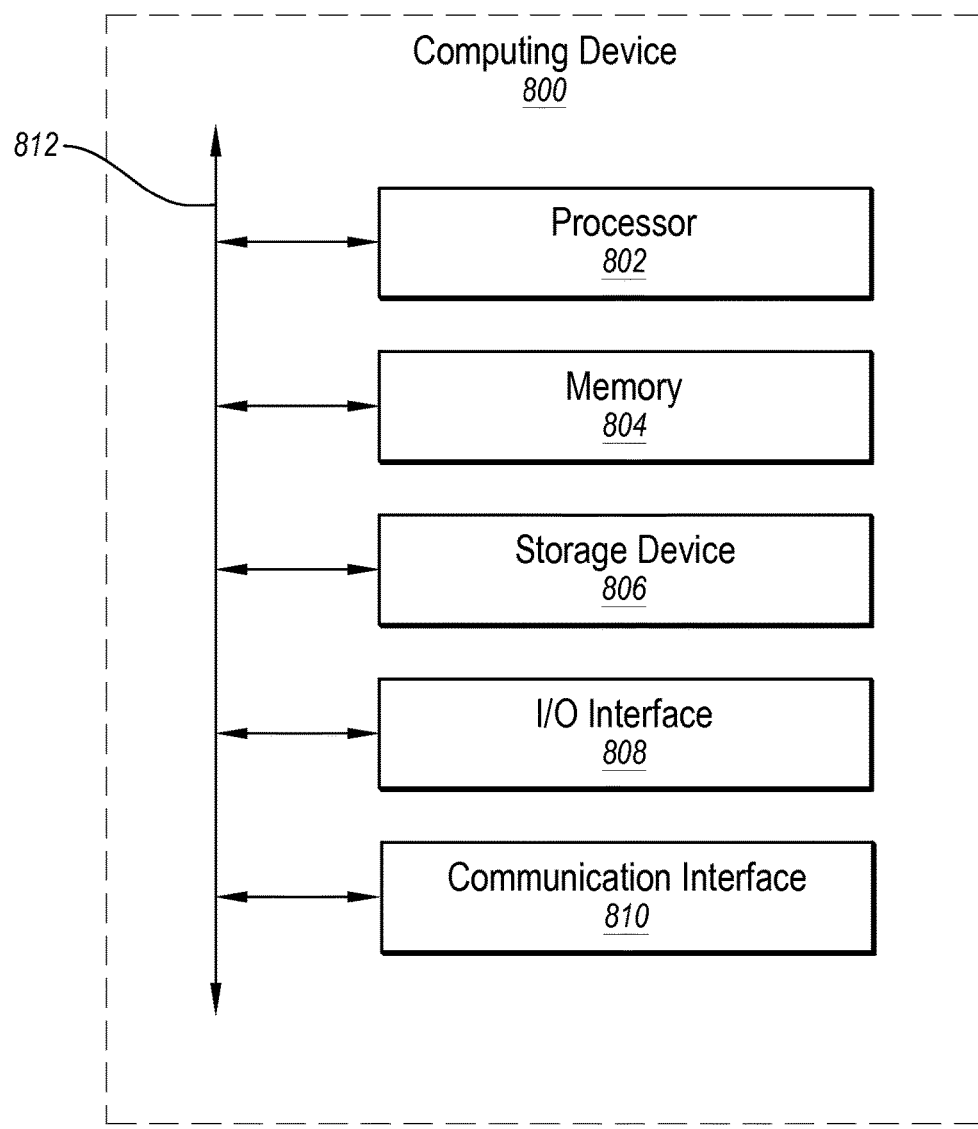
FIG. 8 illustrates a block diagram of an example computing device according to principles described herein.

FIG. 8 illustrates, in block diagram form, an example computing device 800 that may be configured to perform one or more of the processes described above. One will appreciate that system 200, computing device 204, social-networking system 208, and/or system 100 each comprise one or more computing devices in accordance with implementations of computing device 800. As shown by FIG. 8, the computing device may comprise a processor 802, a memory 804, a storage device 806, an I/O interface 808, and a communication interface 810, which may be communicatively coupled by way of communication infrastructure 812. While an example computing device 800 is shown in FIG. 8, the components illustrated in FIG. 8 are not intended to be limiting. Additional or alternative components may be used in other embodiments. Furthermore, in certain embodiments, a computing device 800 may include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 may comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, a gyroscope, an accelerometer, network interface, modem, other known I/O devices or a combination of such I/O devices. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 may include hardware, software, or both. In any event, communication interface 810 may provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, system 200 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system may access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept may represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept may include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system may access a concept node corresponding to the name, and construct a web page including the name and other information associated with the concept.

An edge between a pair of nodes may represent a relationship between the pair of nodes. For example, an edge between two user nodes may represent a friendship between two users. For another example, the social-networking system may construct a web page (or a structured document) of a concept node (e.g., a restaurant, a celebrity), incorporating one or more selectable buttons (e.g., "like", "check in") in the web page. A user may access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes may be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
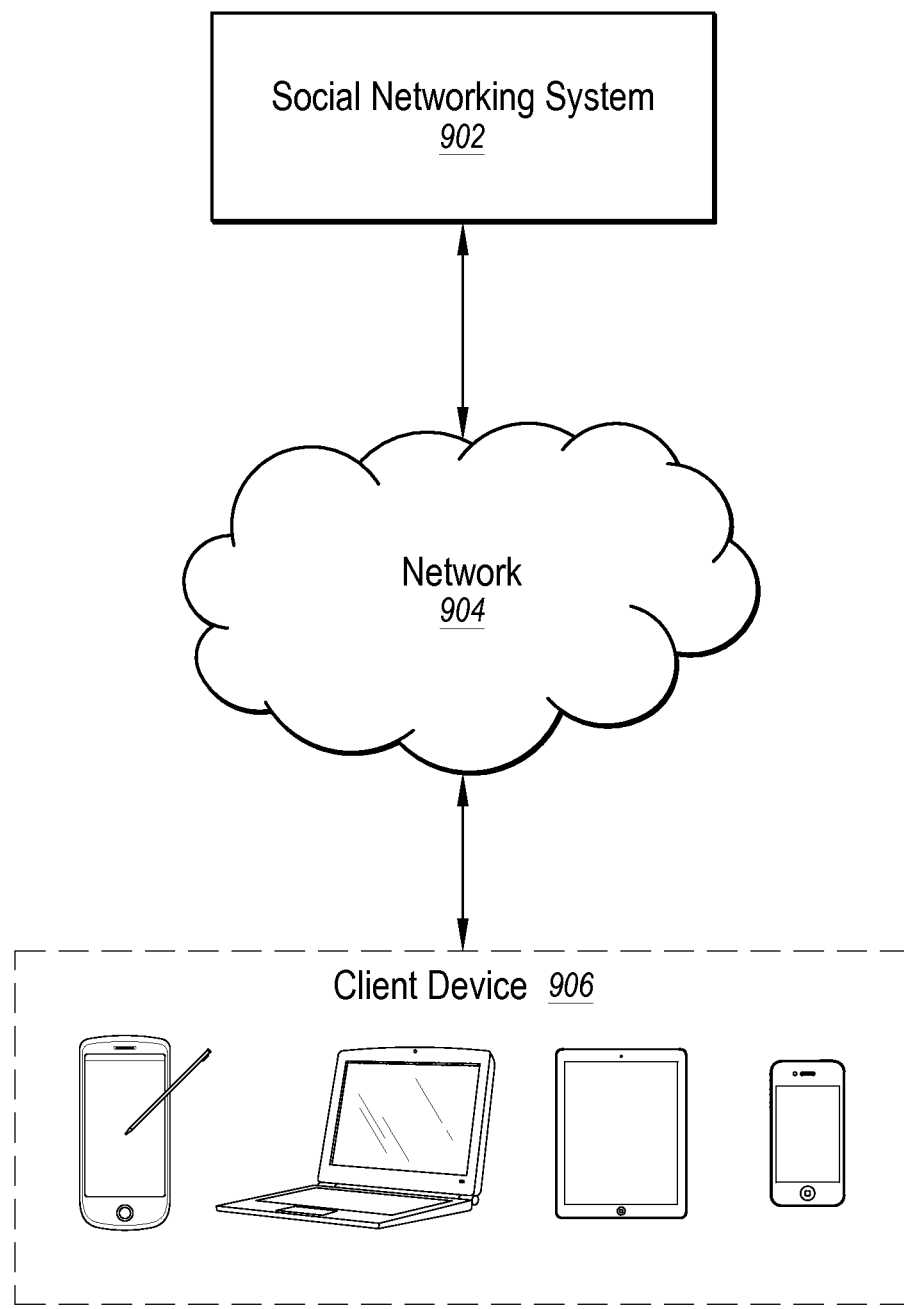
FIG. 9 illustrates an example network environment of a social-networking system according to principles described herein.

FIG. 9 illustrates an example network environment of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system 902. A user of the social-networking system 902 may access the social-networking system 902 using a client device such as client device 906. In particular embodiments, the client device 906 may interact with the social-networking system 902 through a network 904.

The client device 906 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
presenting a first view of a graphical user interface for a client application, wherein a plurality of actions is available to a user at a particular time within the first view;
determining that the user has not previously performed a subset of actions from the plurality of actions available to the user at the particular time within the first view during one or more prior presentations of the first view;
prioritizing the subset of actions based at least in part on the user not having previously performed the subset of actions during the one or more prior presentations of the first view;
detecting, using at least one processor, a disruption in user activity relative to the first view;
identifying a particular action from the subset of actions based on the prioritization of the subset of actions; and
in response to the detected disruption, presenting user assistance information associated with the particular action, the user assistance information comprising a graphical illustration of the particular action within the first view of the graphical user interface.

2. The method of claim 1, wherein the plurality of actions available to the user within the first view are available to the user at a first particular time and one or more actions available to the user within a second view of the graphical user interface are available to the user at a second particular time.

3. The method of claim 2, wherein the graphical illustration of the particular action within the first graphical user interface comprises an animation of the particular action.

4. The method of claim 1, wherein presenting the user assistance information associated with the particular action comprises presenting textual instructions for completing the particular action.

5. The method of claim 1, further comprising:
detecting an accumulated progress for completing the particular action by the user within the first graphical user interface; and
presenting an action progress indicator that indicates the accumulated progress as the user performs the particular action.

6. The method of claim 5, wherein the action progress indicator that indicates the accumulated progress comprises a completion percentage.

7. The method of claim 1, wherein detecting the disruption in user activity comprises detecting a failed attempt by the user to perform one of the plurality of actions available to the user at the particular time within the first view.

8. The method of claim 1, further comprising:
presenting a second view of the graphical user interface, wherein one or more actions are available to the user within the second view;
detecting, using the at least one processor, a disruption in user activity relative to the second view;

identifying a second particular action from the one or more actions available within the second view based on a prioritization of the one or more actions within the second view; and in response to a detected disruption in user activity relative to the second view, presenting user assistance information associated with the second particular action.

9. The method of claim 1, wherein prioritizing the subset of actions determines an order in which user assistance information is presented for the plurality of actions available to the user at the particular time within the first view.

10. The method of claim 9, further comprising displaying user assistance information for a first action with a first priority chronologically before displaying user assistance information for a second action with a second priority, the first priority being higher than the second priority.

11. The method of claim 9, wherein prioritizing the subset of actions is further based on a discoverability of the particular action relative to a discoverability of other actions from the subset of actions.

12. The method of claim 1, further comprising:
detecting that the user assistance information is passively dismissed without successful completion of the particular action; and
presenting the user assistance information associated with the particular action a second time in a new presentation of the first view in response to a second activity disruption in the first view.

13. A system comprising:
at least one processor;
at least one non-transitory computer readable storage medium storing instructions thereon that, when executed by the at least one processor, cause the system to:
present a first view of a graphical user interface for a client application, wherein a plurality of actions is available to a user at a particular time within the first view;
determine that the user has not previously performed a subset of actions from the plurality of actions available to the user at the particular time within the first view during one or more prior presentations of the first view;
prioritize the subset of actions based at least in part on the user not having previously performed the subset of actions during the one or more prior presentations of the first view;
detect a disruption in user activity relative to the first view;
identify a particular action from the subset of actions based on the prioritization of the subset of actions; and
in response to the activity disruption, present user assistance information associated with the particular action, the user assistance information comprising a graphical illustration of the particular action within the first view of the graphical user interface.

14. The system of claim 13, further comprising instructions that, when executed by the at least one processor, cause the system to:
present a second view of the graphical user interface, wherein one or more actions are available to the user within the second view;
determine that the user has not previously performed a subset of actions from the one or more actions available within the second view;
prioritize the subset of actions from the one or more actions available within the second view based at least in part on the user not having previously performed the subset of actions from the one or more actions available to the user within the second view;
detect a disruption in user activity relative to the second view;
identify a second particular action from the one or more actions available within the second view based on the prioritization of the one or more actions available within the second view; and
in response to a detected disruption in user activity relative to the second view, present user assistance information associated with the second particular action.

15. The system of claim 13, wherein prioritizing the subset of actions is further based on a discoverability of the particular action relative to a discoverability of other actions from the subset of actions.

16. The system of claim 13, further comprising instructions that, when executed by the at least one processor, cause the system to:
identify an action from the plurality of actions available to the user within the first view, wherein the user has previously performed the identified action in a prior presentation of the first view;
identify an original priority of the identified action that the user previously performed; and
assign a new priority to the identified action that the user previously performed in response to determining that the user has previously performed the identified action in a prior presentation of the first view, the new priority being lower than the original priority.

17. A non-transitory computer readable storage medium comprising instructions that, when executed by at least one processor, cause a computer system to:
present a first view of a graphical user interface for a client application, wherein a plurality of actions is available to a user at a particular time within the first view;
determine that the user has not previously performed a subset of actions from the plurality of actions available to the user at the particular time within the first view during one or more prior presentations of the first view;
prioritize the subset of actions based at least in part on the user not having previously performed the subset of actions during the one or more prior presentations of the first view;
detect a disruption in user activity relative to the first view;
identify a particular action from the subset of actions based on the prioritization of the subset of actions; and
in response to the activity disruption, present user assistance information associated with the particular action, the user assistance information comprising a graphical illustration of the particular action within the first view of the graphical user interface.

18. The non-transitory computer readable storage medium of claim 17, further comprising instructions that, when executed by the at least one processor, cause the computer system to:
determine, for a new presentation of the first view in which the particular action is available to the user, that the user has previously performed the particular action from the subset of actions in a prior presentation of the first view; and prevent presentation of the user assistance information for the particular action in the new presentation of the first view in response to determining that the user has previously performed the particular action from the subset of actions in the prior presentation of the first view.

19. The non-transitory computer readable storage medium of claim 17, further comprising instructions that, when executed by the at least one processor, cause the computer system to:
- store a list of successfully completed actions and actively dismissed user assistance information in a user profile associated with the graphical user interface; and
- access the list of successfully completed actions and actively dismissed user assistance information from the user profile in a new presentation of the first view of the graphical user interface for determining an order in which to present user assistance information associated with the plurality of actions available to the user within the first view.

20. The non-transitory computer readable storage medium of claim 17, further comprising instructions that, when executed by the at least one processor, cause the computer system to:
- detect a user interaction to perform an additional action from the plurality of actions available to the user prior to presenting the user assistance information associated with the additional action; and
- store the user assistance information for the additional action as actively dismissed user assistance information.

* * * * *